US011513019B2

(12) United States Patent
Lindemann et al.

(10) Patent No.: US 11,513,019 B2
(45) Date of Patent: Nov. 29, 2022

(54) BASELINE SIGNAL CALCULATION

(71) Applicant: Cirrus Logic International Semiconductor Ltd., Edinburgh (GB)

(72) Inventors: Eric Lindemann, Austin, TX (US); Pablo Peso Parada, London (GB); Tanner Rosenthal, Austin, TX (US); Siddharth Maru, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 123 days.

(21) Appl. No.: 17/128,676

(22) Filed: Dec. 21, 2020

(65) Prior Publication Data

US 2022/0196503 A1    Jun. 23, 2022

(51) Int. Cl.
*G01L 25/00* (2006.01)
*G06F 3/041* (2006.01)

(52) U.S. Cl.
CPC ............ *G01L 25/00* (2013.01); *G06F 3/0418* (2013.01); *G06F 3/04144* (2019.05)

(58) Field of Classification Search
CPC ....................................................... G01L 25/00
See application file for complete search history.

(56) References Cited

U.S. PATENT DOCUMENTS

| 8,040,142 B1 | 10/2011 | Bokma et al. |
| 2006/0267953 A1 | 11/2006 | Peterson, Jr. et al. |
| 2006/0293864 A1 | 12/2006 | Soss |
| 2012/0056851 A1 | 3/2012 | Chen et al. |
| 2014/0210257 A1 | 7/2014 | Buttolo et al. |
| 2017/0242539 A1* | 8/2017 | Mani ...................... G06F 3/0445 |
| 2019/0102031 A1 | 4/2019 | Schutzberg et al. |
| 2021/0152174 A1 | 5/2021 | Yancey et al. |

FOREIGN PATENT DOCUMENTS

| EP | 3106970 A1 | 12/2016 |
| GB | 2566271 A | 3/2019 |
| WO | 2021257287 A1 | 12/2021 |

OTHER PUBLICATIONS

Combined Search and Examination Report under Sections 17 and 18(3), UKIPO, Application No. GB2118311.6, dated Jun. 9, 2022.

* cited by examiner

*Primary Examiner* — Mischita L Henson
(74) *Attorney, Agent, or Firm* — Jackson Walker L.L.P.

(57) ABSTRACT

A baseline unit for use in a sensor system, the sensor system comprising N force sensors which output N sensor signals, respectively, where N≥1, the baseline unit configured to: monitor a measure of a rate of change of a sensor test signal, the sensor test signal being one of said N sensor signals or a signal derived from one or more of said N sensor signals; and in dependence upon the measure of the rate of change, control a stored baseline setting to control how a baseline test signal is calculated from said N sensor signals using a baseline-calculation method, the baseline-calculation method configured by the currently-stored baseline setting.

20 Claims, 18 Drawing Sheets

Fig. 3
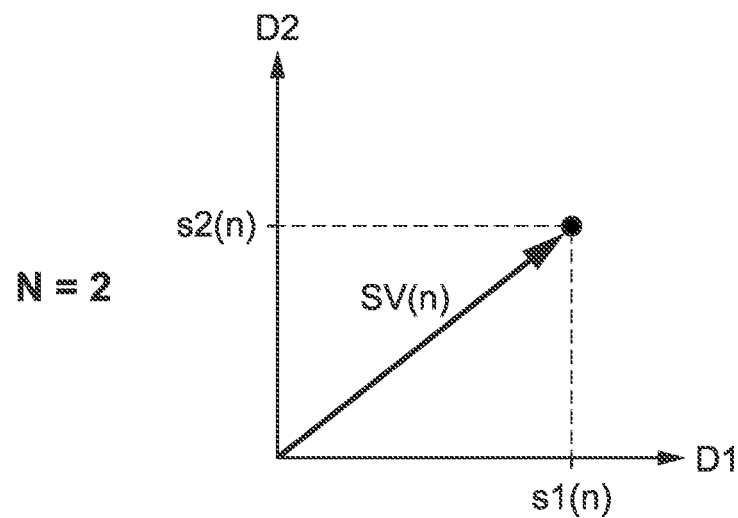
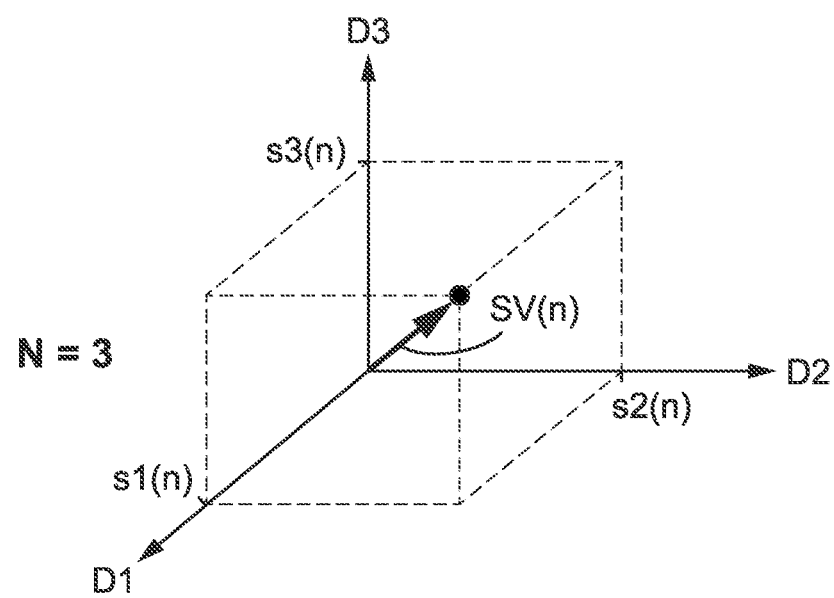

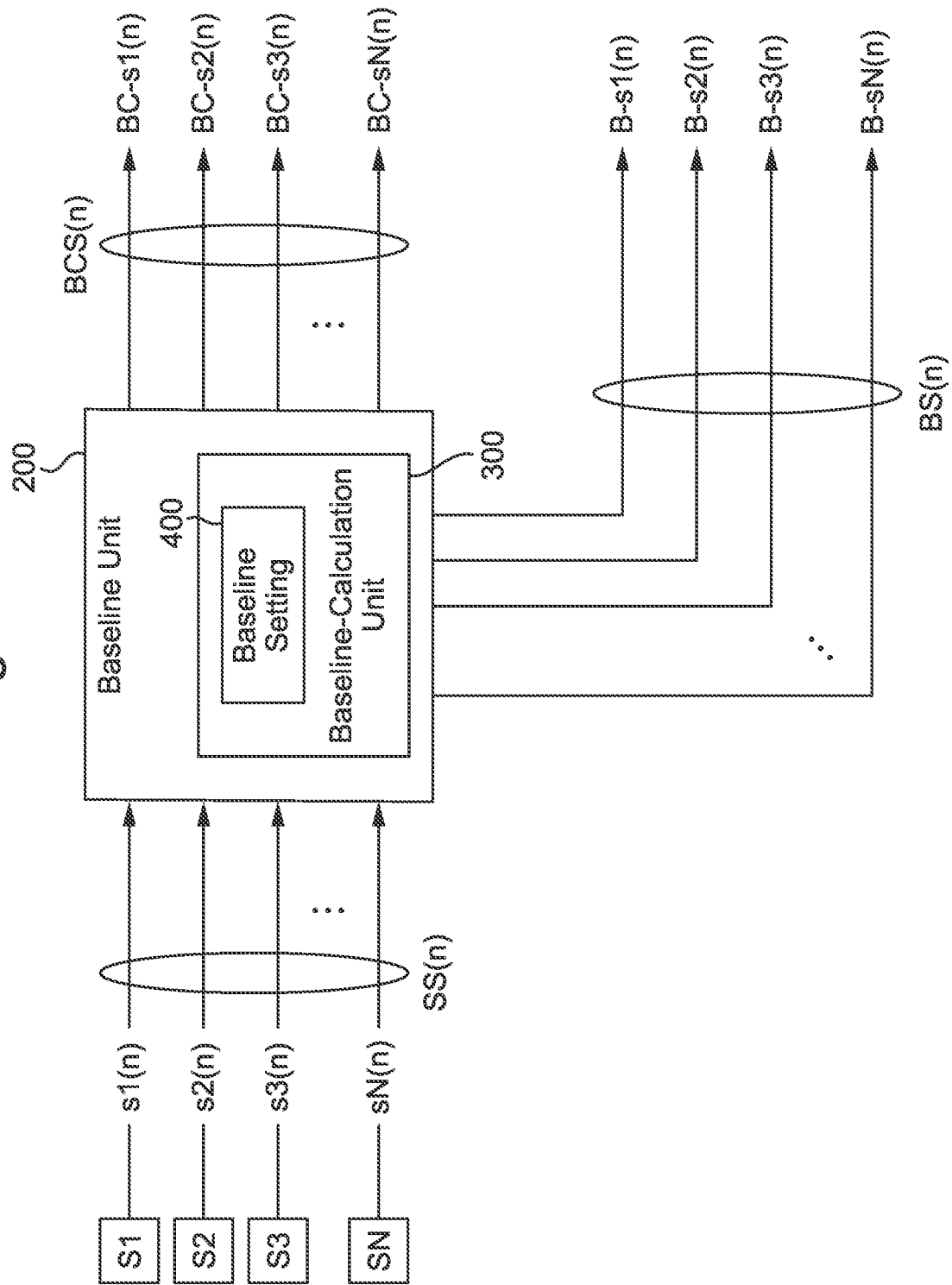

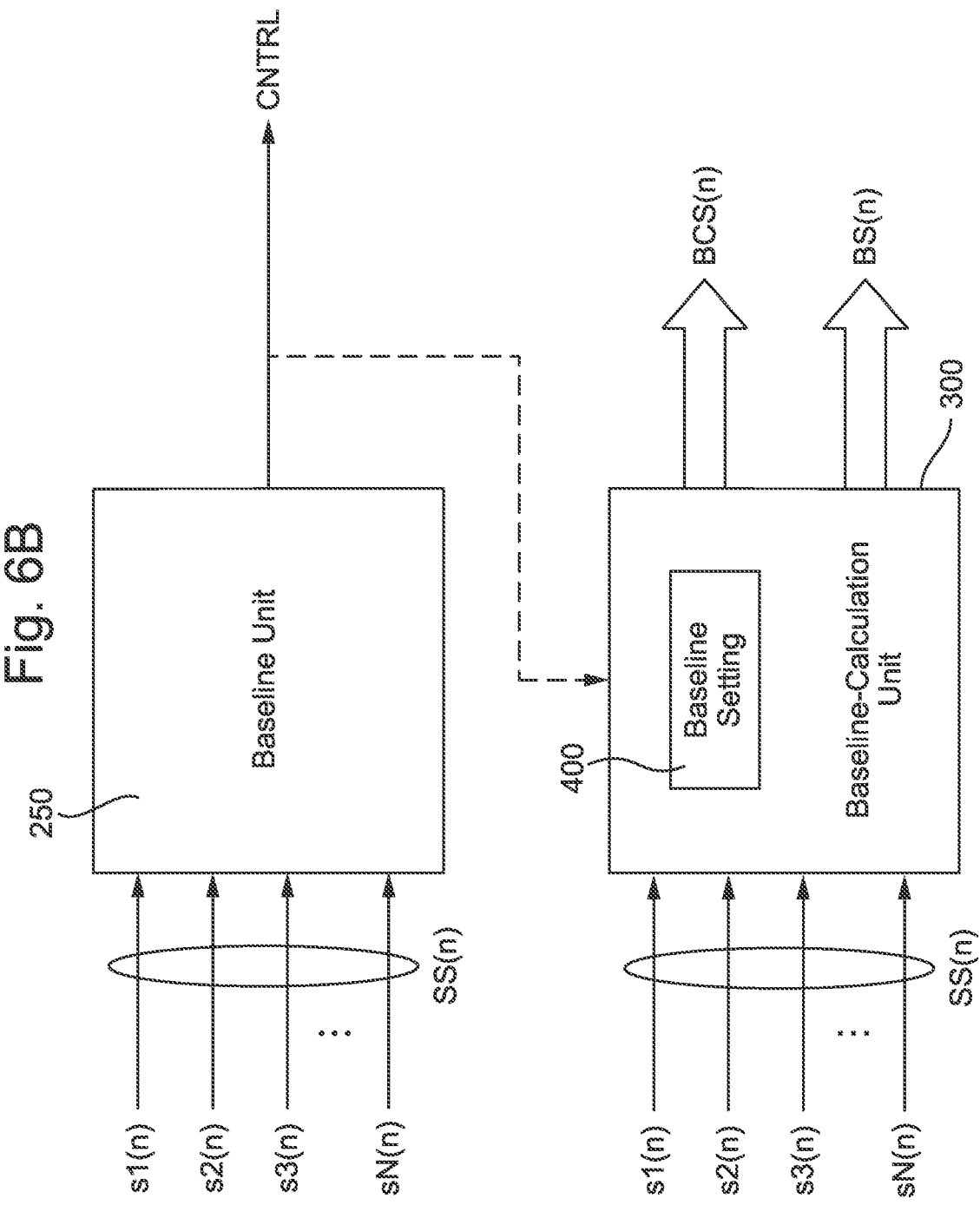

BASELINE SIGNAL CALCULATION

FIELD OF DISCLOSURE

The present disclosure relates in general to sensor systems which comprise at least one force sensor, and in particular to baseline signal calculation in relation to sensor signals obtained from such force sensors.

A baseline unit may be provided for use in such a sensor system to carry out baseline signal calculation.

BACKGROUND

Force sensors and sensor systems having force sensors may be provided for use with, or as part of, a host device. A host device having one or more force sensors may be referred to as a sensor system or force sensor system.

In this context, a host device may be considered an electrical or electronic device and may be a mobile device. Examples devices include a portable and/or battery powered host device such as a mobile telephone or smartphone, an audio player, a video player, a PDA, a mobile computing platform such as a laptop computer or tablet and/or a games device.

In general, a force sensor is configured to output a sensor signal indicative of a temporary mechanical distortion of a material under an applied force. The material may for example be a metal plate which is part of, or associated with, the force sensor, and which is pushed/pressed or otherwise deformed by a user. In the context of a host device, the material may be part of a chassis or external casing of the device. The force may for example be applied and subsequently reduced or removed in a user press operation, referred to as a button press where the force sensor is used to implement a button, the user press operation starting when the force is applied.

Force sensing may be carried out by a variety of different types of force sensor. Example types of force sensor include capacitive displacement sensors, inductive force sensors, strain gauges, piezoelectric force sensors, force sensing resistors (resistive force sensors), piezoresistive force sensors, thin film force sensors and quantum tunneling composite-based force sensors. Force sensor systems may comprise a mixture of types of sensor/sensor technology.

Modern electronic devices are increasingly using "virtual button" technology to replace traditional push buttons. An example is the volume or power button on the side of a smartphone. The traditional push buttons have contacts that can age and wear, and virtual buttons not only avoid this problem, but can be made without introducing openings in the smartphone chassis, thus increasing waterproofing and reducing general exposure to dirt and grease.

To replace physical buttons, virtual buttons are implemented using a number of force sensors in a force sensor system as described above. In the context of a smartphone, as a convenient running example of a host device, a number of such sensors may be arranged on the inside of the chassis—e.g. on the inside left-side and/or right-side edges or on the front or back of the device. The sensors are then responsive to physical pressure applied to the chassis.

Generally, the objective is to define a certain region of the device chassis as corresponding to a virtual button, and to use sensor information to determine when that region of the chassis has enough applied force to constitute an associated button press. Often multiple regions are defined corresponding respectively to multiple virtual buttons.

Force sensors deployed in modern host devices produce signals that have a slowly varying baseline level that is modulated by physical events (e.g. changes in ambient temperature or pressure) that need to be detected. An example application is a button press sensor implemented by way of a force sensor.

A baseline level may be taken to mean a level (e.g. bias level) at which a corresponding sensor signal is taken to indicate a zero magnitude or zero input. In the case of a force sensor, a baseline level may be taken to mean a level at which a corresponding sensor signal is taken to indicate zero applied force. A baseline signal may be taken to mean a signal which indicates baseline level. Ultimately, force information may be determined from a given sensor signal based on a difference between that sensor signal and its corresponding baseline signal.

It has been found that existing techniques for determining a baseline signal corresponding to a sensor signal are unsatisfactory or open to improvement. It is desirable to provide an improved technique for determining baseline level, and for example a corresponding baseline unit configured to carry out baseline signal calculation.

SUMMARY

According to a first aspect of the present disclosure, there is provided a baseline unit for use in a sensor system, the sensor system comprising N force sensors which output N sensor signals, respectively, where $N \geq 1$, the baseline unit configured to: monitor a measure of a rate of change of a sensor test signal, the sensor test signal being one of said N sensor signals or a signal derived from one or more of said N sensor signals; and in dependence upon the measure of the rate of change, control a stored baseline setting to control how a baseline test signal is calculated from said N sensor signals using a baseline-calculation method, the baseline-calculation method configured by the currently-stored baseline setting.

In this way, baseline signal calculation may be controlled based on the measure of the rate of change of a sensor test signal, allowing the control to effectively be dynamic.

The baseline unit may be configured to access the stored baseline setting, and calculate the baseline test signal from said N sensor signals using the baseline-calculation method.

The baseline unit may be configured to monitor a difference between the sensor test signal and the baseline test signal as the measure of the rate of change of the sensor test signal, and control the stored baseline setting in dependence upon the difference to control how the baseline test signal is calculated from said N sensor signals. That is, the difference between the sensor test signal and the baseline test signal may serves as one measure of the rate of change of a sensor test signal. The difference may comprise a difference in one or more of magnitude, gradient and frequency spectrum.

The baseline unit may be configured to set the stored baseline setting at different values for different ranges of the measure (e.g. difference).

The baseline unit may be configured to change the stored baseline setting when a defined change condition is met. The change condition may comprise an increase in the measure (e.g. difference) to a value above a threshold.

The measure (e.g. difference) and the threshold may be signed values, and the baseline unit may be configured to determine that the measure (e.g. difference) exceeds the threshold when the measure (e.g. difference) and the threshold have the same sign as one another and the magnitude of the measure (e.g. difference) is larger than the magnitude of the threshold. In another case, the baseline unit may be configured to determine that the measure (e.g. difference) exceeds the threshold when an absolute value of the measure (e.g. difference) is larger than an absolute value of the threshold.

The change to the stored baseline setting may be a first change from a below-threshold value to an above-threshold value. In such a case, the baseline unit may be configured to: after making said first change to the baseline setting, determine whether at least one defined further-change condition is met; and when it is determined that a further-change condition is met, further change the stored baseline setting. At least one said further change may change the stored baseline setting to a value closer to the below-threshold value or to the below-threshold value.

The threshold may be a first threshold. A further-change condition may comprise the expiry of a defined time period, optionally measured from when the first change is made or from when the preceding change is made. A further-change condition may comprise an increase in the measure (e.g. difference) to a value above a second threshold. A further-change condition may comprise a reduction in the measure (e.g. difference) to a value below a third threshold. A further-change condition may comprise a reduction in temporal variance or jitter in the sensor test signal, or in any of the sensor signals, from a high value above a corresponding temporal-variance threshold to a low value below that temporal-variance threshold.

The baseline-calculation method may comprise low-pass filtering defined by a filter parameter. The baseline setting may define a value of the filter parameter. The filter parameter may comprise a time constant, a forgetting factor and/or a corner frequency which defines the low-pass filtering, optionally a passband of the low-pass filtering.

The baseline unit may be configured, when the measure (e.g. difference) exceeds a threshold, to change the stored baseline setting to change a size of the passband of the low-pass filtering from a first size to a second size, smaller in frequency bandwidth than the first size. The second size may be sufficient to substantially maintain a value of the baseline test signal or to reduce a rate of change of the baseline test signal, optionally to substantially zero.

The baseline unit may be configured, when the measure (e.g. difference) exceeds a threshold, to change the stored baseline setting to a setting which disables or overrides an output of the low-pass filtering and substantially maintains a value of the baseline test signal.

The sensor test signal may be the sensor signal for a given force sensor of the sensor system or a signal derived therefrom. The baseline unit may be configured to calculate the baseline test signal as a baseline signal for that force sensor from the sensor test signal using the baseline-calculation method.

It may be that $N \geq 2$. In such a case, values of the baseline setting may each comprise component values per force sensor. The baseline unit may then be configured, for each force sensor, to calculate its baseline signal using the baseline-calculation method as configured by its corresponding component value of the currently-stored baseline setting.

For example, the baseline unit may be configured, for each force sensor, to: calculate a baseline test signal as the baseline signal for that force sensor from its sensor signal using the baseline-calculation method as configured by the component value concerned of the currently-stored baseline setting; monitor a difference between a sensor test signal and the baseline test signal for that force sensor (as the measure of the rate of change of the sensor test signal), the sensor test signal being the sensor signal for that force sensor or a signal derived therefrom; and in dependence upon the difference for that force sensor, control the component value concerned of the stored baseline setting to control how the baseline signal for that force sensor is calculated based on its sensor signal.

It may be that $N \geq 2$. The given force sensor may be a first force sensor of the sensor system. The baseline unit may be configured to calculate a baseline signal for a second force sensor of the sensor system from its sensor signal using the baseline-calculation method or a method derived therefrom, for example so that how the baseline signal for the second force sensor is calculated from its sensor signal changes when how the baseline signal for the first force sensor is calculated from the sensor test signal changes.

The baseline unit may be configured to calculate the sensor test signal based on a combination of the N sensor signals, where $N \geq 2$. The baseline unit may be configured to calculate the baseline test signal from the sensor test signal using the baseline-calculation method. The baseline unit may be configured to calculate a baseline signal for at least one of the force sensors from its sensor signal using the baseline-calculation method.

The baseline unit may be configured to calculate a baseline signal for each of the force sensors from its sensor signal using the baseline-calculation method, and calculate the baseline test signal based on a combination of the N baseline signals.

The baseline test signal may be based on a sum or average of the N baseline signals. The sensor test signal may be based on a sum or average of the N sensor signals.

The N sensor signals may define a sensor test vector in N-dimensional space, and the N baseline signals may define a baseline test vector in the N-dimensional space. In such a case, the baseline unit may be configured to determine a difference between the sensor test signal and the baseline test signal (as the measure of the rate of change of the sensor test signal) based on a distance such as a Euclidean distance between respective locations in the N-dimensional space defined by the sensor test vector and the baseline test vector.

The baseline unit may be configured to: apply a signal-conditioning process to the N sensor signals to generate N conditioned sensor signals, respectively; calculate the baseline test signal from said N conditioned sensor signals; and derive the sensor test signal from said N conditioned sensor signals. The signal-conditioning process may comprise removing the common mode from the N sensor signals, optionally by subtracting an average of the N sensor signals from each of the N sensor signals.

The baseline unit may be configured, for each force sensor, to: calculate a baseline signal from its sensor signal using the baseline-calculation method; and/or generate a baseline-corrected signal by subtracting its baseline signal from its sensor signal. The baseline unit may be configured to store the baseline setting.

It may be that $N \geq 3$, or $N \geq 4$, or $N \geq 8$. Each sensor signal may be indicative of an applied force. The force sensors of the sensor system may be arranged to detect an applied force corresponding to a press of at least one virtual button.

According to a second aspect of the present disclosure, there is provided a baseline unit for use in a sensor system, the sensor system comprising N force sensors which output N sensor signals, respectively, where $N \geq 1$, the baseline unit configured to: access a stored baseline setting; calculate a baseline test signal from said N sensor signals using a baseline-calculation method, the baseline-calculation method configured by the currently-stored baseline setting;

monitor a difference between a sensor test signal and the baseline test signal, the sensor test signal being one of said N sensor signals or a signal derived from one or more of said N sensor signals; and in dependence upon the difference, control the stored baseline setting to control how the baseline test signal is calculated from said N sensor signals.

According to a third aspect of the present disclosure, there is provided a baseline unit for use in a sensor system, the sensor system comprising N force sensors which output N sensor signals, respectively, where N≥1, the baseline unit configured to: access a stored baseline setting; calculate a baseline test signal from said N sensor signals using a baseline-calculation method, the baseline-calculation method configured by the currently-stored baseline setting; monitor at least one feature of a sensor test signal, the sensor test signal being one of said N sensor signals or a signal derived from one or more of said N sensor signals; and in dependence upon the at least one feature, control the stored baseline setting to control how the baseline test signal is calculated from said N sensor signals. The at least one feature may comprise a gradient, a rate of change, temporal variance or jitter of the sensor test signal, or a measure thereof.

According to a fourth aspect of the present disclosure, there is provided a baseline unit for use in a sensor system, the sensor system comprising N force sensors which output N sensor signals, respectively, where N≥1, the baseline unit configured to: monitor at least one feature of a sensor test signal, the sensor test signal being one of said N sensor signals or a signal derived from one or more of said N sensor signals; and in dependence upon the at least one feature, control a stored baseline setting to control how a baseline test signal is calculated from said N sensor signals using a baseline-calculation method, the baseline-calculation method configured by the currently-stored baseline setting.

The baseline unit may be configured to: access the stored baseline setting; and calculate the baseline test signal from said N sensor signals using the baseline-calculation method.

The at least one feature may comprise a gradient, a rate of change, temporal variance or jitter of the sensor test signal, or a measure thereof.

According to a fifth aspect of the present disclosure, there is provided a sensor system or a host device, comprising: the baseline unit as claimed in any of the preceding aspects; and the N force sensors.

Also envisaged are corresponding method aspects, computer program aspects and storage medium aspects. Features of one aspect may be applied to another and vice versa.

BRIEF DESCRIPTION OF THE DRAWINGS

Reference will now be made, by way of example only, to the accompanying drawings, of which:

FIG. 3 is useful for understanding that sensor samples may be taken to define sample vectors;

FIG. 6A is a schematic diagram of a baseline unit according to an embodiment;

FIG. 6B is a schematic diagram of another baseline unit according to an embodiment;

DETAILED DESCRIPTION

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

Figure 1:
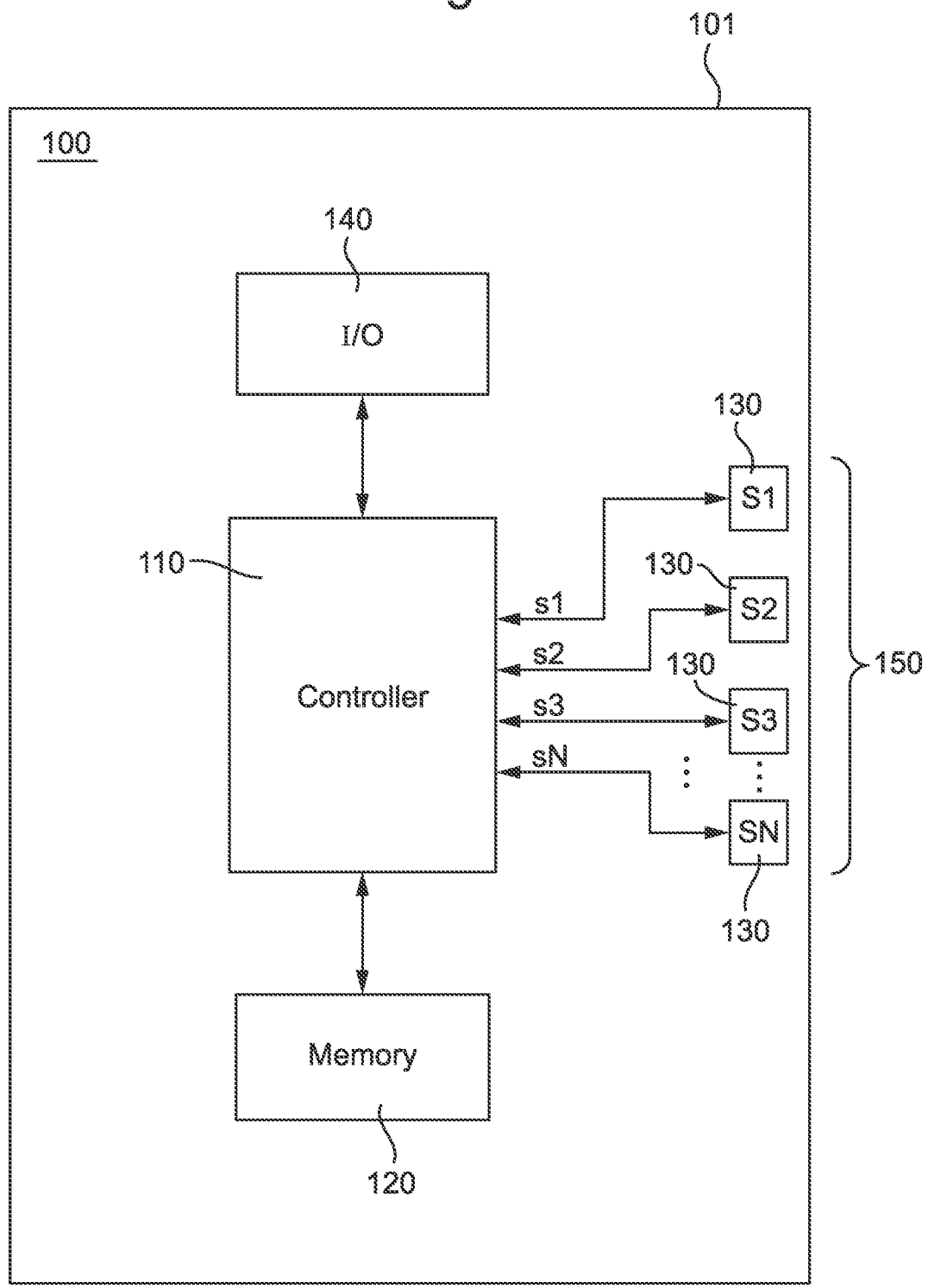
FIG. 1 is a schematic diagram of a host device according to an embodiment.

FIG. 1 is a schematic diagram of a host device 100 according to an embodiment, for example a mobile or portable electrical or electronic device. Example host devices 100 include a portable and/or battery powered host device such as a mobile telephone, a smartphone, an audio player, a video player, a PDA, a mobile computing platform such as a laptop computer or tablet and/or a games device.

As shown in FIG. 1, the host device 100 may comprise an enclosure 101, a controller 110, a memory 120, N force sensors 130, where N≥1, and an input and/or output unit (I/O unit) 140.

The enclosure 101 may comprise any suitable housing, casing, chassis or other enclosure for housing the various components of host device 100. Enclosure 101 may be constructed from plastic, metal, and/or any other suitable materials. In addition, enclosure 101 may be adapted (e.g., sized and shaped) such that host device 100 is readily transported by a user (i.e. a person).

Controller 110 may be housed within enclosure 101 and may include any system, device, or apparatus configured to control functionality of the host device 100, including any or all of the memory 120, the force sensors 130, and the I/O unit 140. Controller 110 may be implemented as digital or analogue circuitry, in hardware or in software running on a processor, or in any combination of these.

Thus controller 110 may include any system, device, or apparatus configured to interpret and/or execute program instructions or code and/or process data, and may include, without limitation a processor, microprocessor, microcontroller, digital signal processor (DSP), application specific integrated circuit (ASIC), FPGA (Field Programmable Gate Array) or any other digital or analogue circuitry configured to interpret and/or execute program instructions and/or process data. Thus the code may comprise program code or microcode or, for example, code for setting up or controlling an ASIC or FPGA. The code may also comprise code for dynamically configuring re-configurable apparatus such as re-programmable logic gate arrays. Similarly, the code may comprise code for a hardware description language such as Verilog TM or VHDL. As the skilled person will appreciate, the code may be distributed between a plurality of coupled components in communication with one another. Where appropriate, such aspects may also be implemented using code running on a field-(re)programmable analogue array or similar device in order to configure analogue hardware. Processor control code for execution by the controller 110, may be provided on a non-volatile carrier medium such as a disk, CD- or DVD-ROM, programmed memory such as read only memory (Firmware), or on a data carrier such as an optical or electrical signal carrier. The controller 110 may be referred to as control circuitry and may be provided as, or as part of, an integrated circuit such as an IC chip.

Memory 120 may be housed within enclosure 101, may be communicatively coupled to controller 110, and may include any system, device, or apparatus configured to retain program instructions and/or data for a period of time (e.g., computer-readable media). In some embodiments, controller 110 interprets and/or executes program instructions and/or processes data stored in memory 120 and/or other computer-readable media accessible to controller 110.

The force sensors 130 are housed within the enclosure 101, and are communicatively coupled to the controller 110. Each force sensor 130 may include any suitable system, device, or apparatus for sensing a force, a pressure, or a touch (e.g., an interaction with a human finger) and for generating an electrical or electronic signal in response to such force, pressure, or touch. Example force sensors 130 include or comprise capacitive displacement sensors, inductive force sensors, strain gauges, piezoelectric force sensors, force sensing resistors, piezoresistive force sensors, thin film force sensors and quantum tunneling composite-based force sensors. There may be a mixture of types of force sensor amongst force sensors 130.

In some arrangements, the electrical or electronic signal generated by a force sensor 130 may be a function of a magnitude of the force, pressure, or touch applied to the force sensor (a user force input) via the enclosure 101. Such electronic or electrical signal may comprise a general purpose input/output (GPIO) signal associated with an input signal in response to which the controller 100 controls some functionality of the host device 100. The term "force" as used herein may refer not only to force, but to physical quantities indicative of force or analogous to force such as, but not limited to, pressure and touch.

The I/O unit 140 may be housed within enclosure 101, may be distributed across the host device 100 (i.e. it may represent a plurality of units) and may be communicatively coupled to the controller 110. Although not specifically shown in FIG. 1, the I/O unit 140 may comprise any or all of a microphone, an LRA (or other device capable of outputting a force, such as a vibration), a radio (or other electromagnetic) transmitter/receiver, a speaker, a display screen (optionally a touchscreen), an indicator (such as an LED), a sensor (e.g. accelerometer, temperature sensor, gyroscope, camera, tilt sensor, electronic compass, etc.) and one or more buttons or keys.

As a convenient example to keep in mind, the host device 100 may be a haptic-enabled device. As is well known, haptic technology recreates the sense of touch by applying forces, vibrations, or motions to a user. The host device 100 for example may be considered a haptic-enabled device (a device enabled with haptic technology) where its force sensors 130 (input transducers) measure forces exerted by the user on a user interface (such as a button or touchscreen on a mobile telephone or tablet computer), and an LRA or other output transducer of the I/O unit 140 applies forces directly or indirectly (e.g. via a touchscreen) to the user, e.g. to give haptic feedback. Some aspects of the present disclosure, for example the controller 110 and/or the force sensors 130, may be arranged as part of a haptic circuit, for instance a haptic circuit which may be provided in the host device 100. A circuit or circuitry embodying aspects of the present disclosure (such as the controller 110) may be implemented (at least in part) as an integrated circuit (IC), for example on an IC chip. One or more input or output transducers (such as the force sensors 130 or an LRA) may be connected to the integrated circuit in use.

Of course, this application to haptic technology is just one example application of the host device 100 comprising the plurality of force sensors 130. The force sensors 130 may simply serve as generic input transducers to provide input signals to control other aspects of the host device 100, such as a GUI (graphical user interface) displayed on a touch-screen of the I/O unit 140 or an operational state of the host device 100 (such as waking components from a low-power "sleep" state).

The host device 100 is shown comprising N force sensors 130, labelled S1 to SN, with their signals labelled s1 to sN, respectively. Although four sensors are shown explicitly, it will be understood that this is just a convenient example. It will be understood that the host device 100 generally need only comprise a single (i.e. at least one) force sensor 130 (i.e. N=1) in connection with the techniques described herein, although N=2, N=3 or N=4 may be considered advantageous in some arrangements. An example considering N=4 will be followed herein, however it will be recalled that in some cases it may be that N=1.

Although FIG. 1 is schematic, it will be understood that the sensors S1 to SN are located so that they can receive force inputs from a user, in particular a user's hand or finger, during use of the host device 100. A particular user force input of interest in this context corresponds to a user touching, pushing, or pressing a virtual button, or swiping the device corresponding to time-staggered virtual button presses. A change in the amount of force applied may be detected, rather than an absolute amount of force detected, for example.

Thus, the force sensors S1 to SN may be located on the host device 100 according to anthropometric measurements of a human hand (e.g. so that a single human hand will be able to apply a force to the force sensor 130, or to multiple force sensors 130 in some cases). For example, the force sensors S1 to SN may be provided on the same side of the host device 100. Merely as a running example, it will be understood that the force sensors S1 to SN are provided in a linear array 150 as indicated in FIG. 1. It will be understood that, where N≥2, the force sensors 130 may be provided at different locations on the device, but may be in close proximity to one another.

Figure 2:
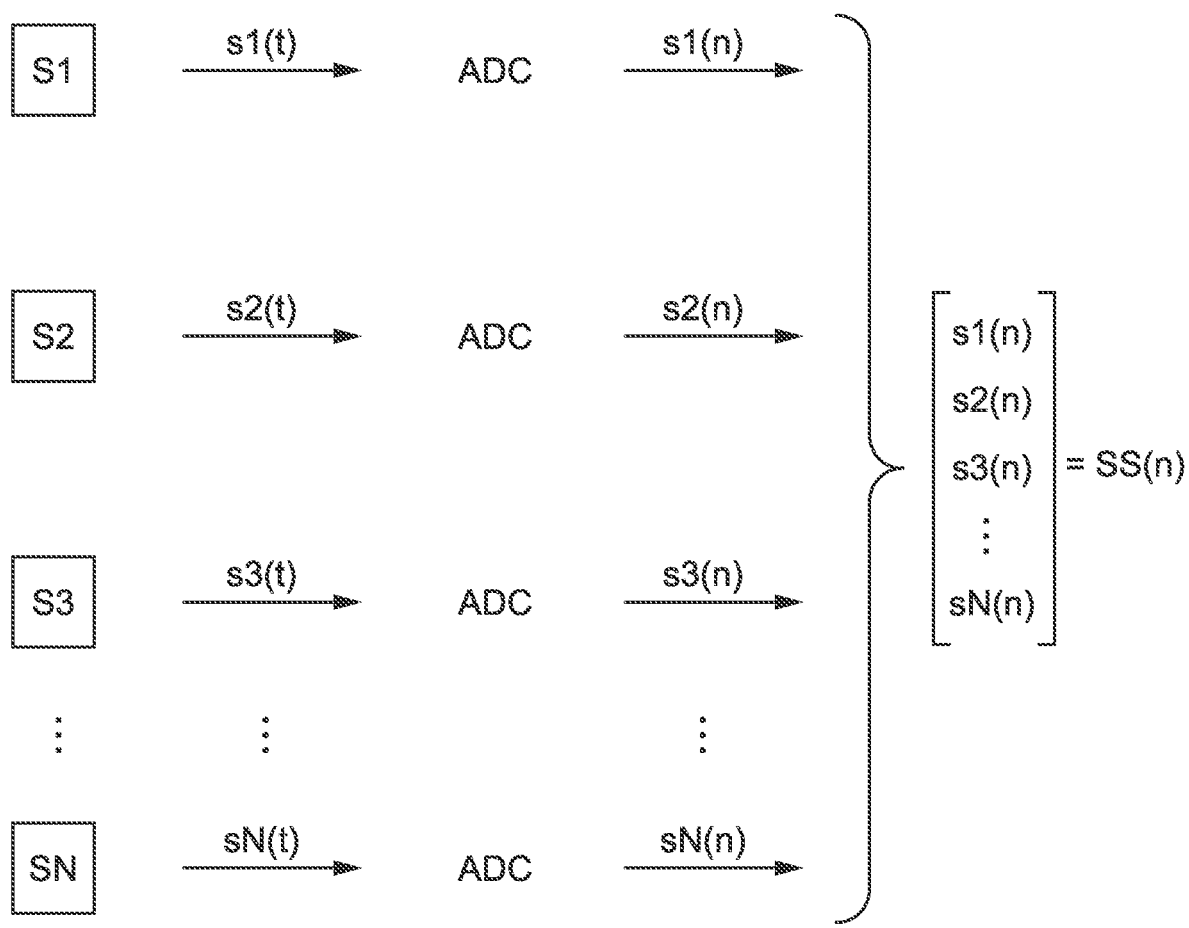
FIG. 2 is a schematic diagram indicating how signals from force sensors of the host device may be arranged and handled.

FIG. 2 is a schematic diagram indicating how the signals from the force sensors S1 to SN may be arranged and handled.

Depending on how the force sensors 130 are configured, the force sensors S1 to SN may provide analogue signals $s1(t)$ to $sN(t)$, respectively, where t is time e.g. in seconds. These analogue signals may then be converted by analogue-to-digital conversion, ADC, at a given (e.g. controllable) sample rate to corresponding digital sample streams $s1(n)$ to $sN(n)$, where n is the sample number. Of course, the force sensors S1 to SN may output respective digital sample streams $s1(n)$ to $sN(n)$ directly.

Assuming the sample streams are synchronised for convenience, the force sensors S1 to SN may be considered to provide a stream of sensor samples $SS(n)$, as indicated in FIG. 2, which each include a sample value from each of the N sensors. In particular, for N≥2, each such sensor sample $SS(n)$ may thus be represented in matrix form as:

$$SS(n) = \begin{bmatrix} s1(n) \\ s2(n) \\ s3(n) \\ \vdots \\ sN(n) \end{bmatrix}$$

Taking N=2 and N=3 as convenient examples where N≥2, it can be understood that each sensor sample may be considered to define a sample vector SV(n) in N-dimensional vector space, where the dimensions are D1 to DN, as indicated in FIG. 3. Each sample vector SV(n) may then be taken to define a location in the vector space, as also indicated. Of course, although only up to three dimensions are shown in FIG. 3, it will be appreciated that for N≥4 higher dimensions of vector space may be considered.

Hereinafter, such sample streams may be referred to as signals for convenience.

Figure 4:
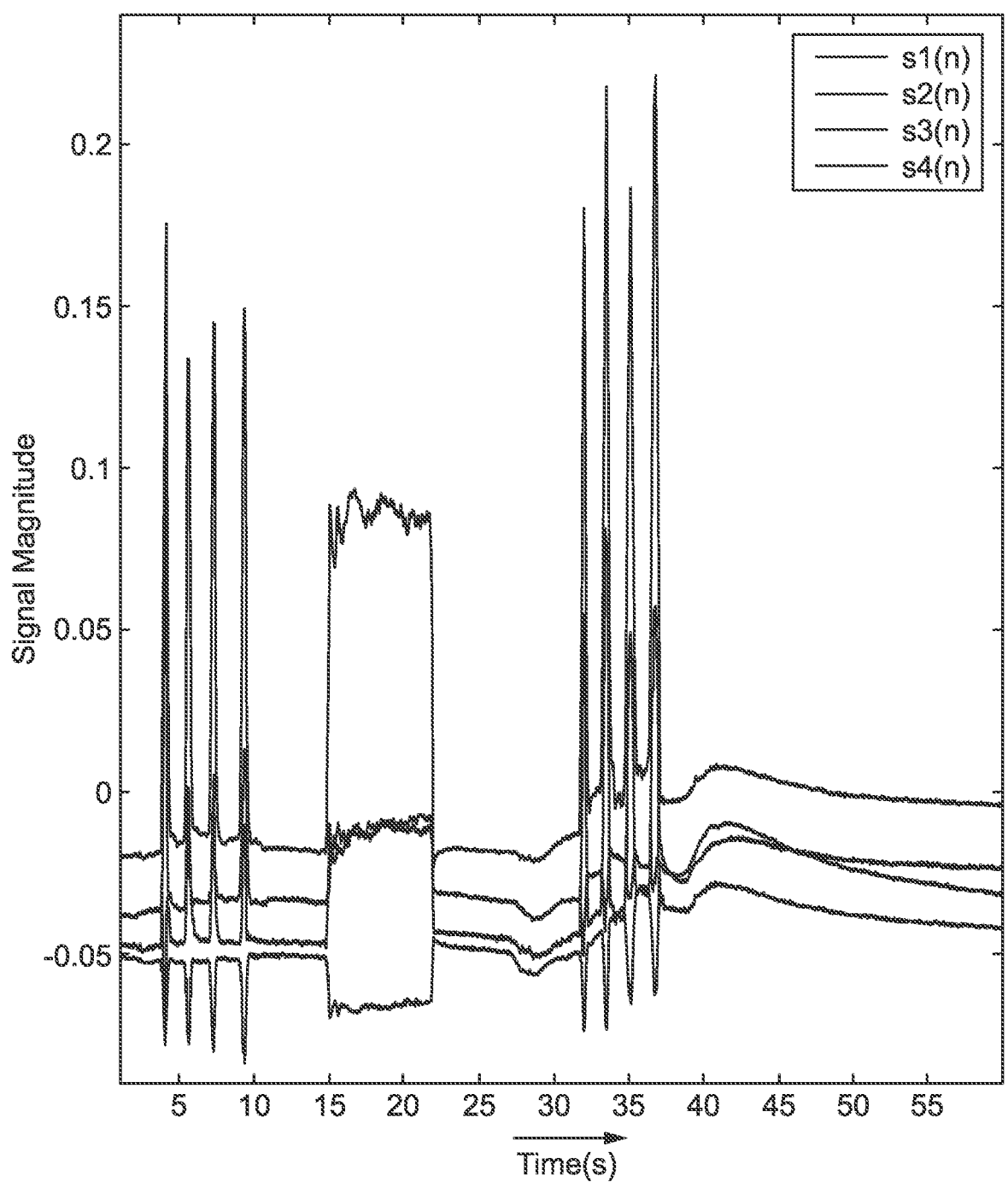
FIGS. 4 and 5 show plots of example signals useful for understanding problems addressed herein.

To better appreciate problems that the techniques disclosed herein may address, FIG. 4 shows a plot of raw sensor signals s1(n) to s4(n) (i.e. without a baseline signal subtracted therefrom) from an example host device 100 where N=4, i.e. where the sensors 130 comprise sensors S1, S2, S3 and S4.

It will be appreciated that the sensor signals s1(n) to s4(n) are plotted against time in seconds, but could have been plotted with the X-axis indicating samples rather than time in seconds, with the plots looking the same for a stable sample rate. Corresponding analogue signals s1(t) to sN(t) could similarly be plotted. Similar considerations apply to the other plots described herein.

The rapid pulses from 4 to 10 seconds and from 33 to 37 seconds correspond to short button presses (i.e. applications of force in relation to a virtual button defined in relation to the force sensors 130). There is a long button press from 15 to 22 seconds. From 27 to 42 seconds a heat gun is applied to the sensors, causing an increase in ambient temperature and a corresponding gradual rise in baseline levels of the sensor values. Short button presses are superimposed on this gradual heat-related rise. From 42 to 60 seconds the sensors cool down causing them to return closer to their original baseline values. There may also be slow variations in baseline values in addition to temperature-induced variations, and these may be referred to as drift.

As above, for each sensor 130 the difference between its sensor signal (sensor level) and its corresponding baseline signal (baseline level or value) is of interest. It is therefore desirable to determine a baseline signal for each sensor 130 and subtract it from its sensor signal. Preferably, the baseline signal for each sensor 130 will include (i.e. follow or track) the more gradual changes due to temperature changes but exclude the more rapid changes due to button presses.

A naïve approach to separating fast sensor variations from slower variations due to e.g. temperature changes or drift, is to high-pass filter the sensor signals. This may be referred to as AC-coupling.

Figure 5:
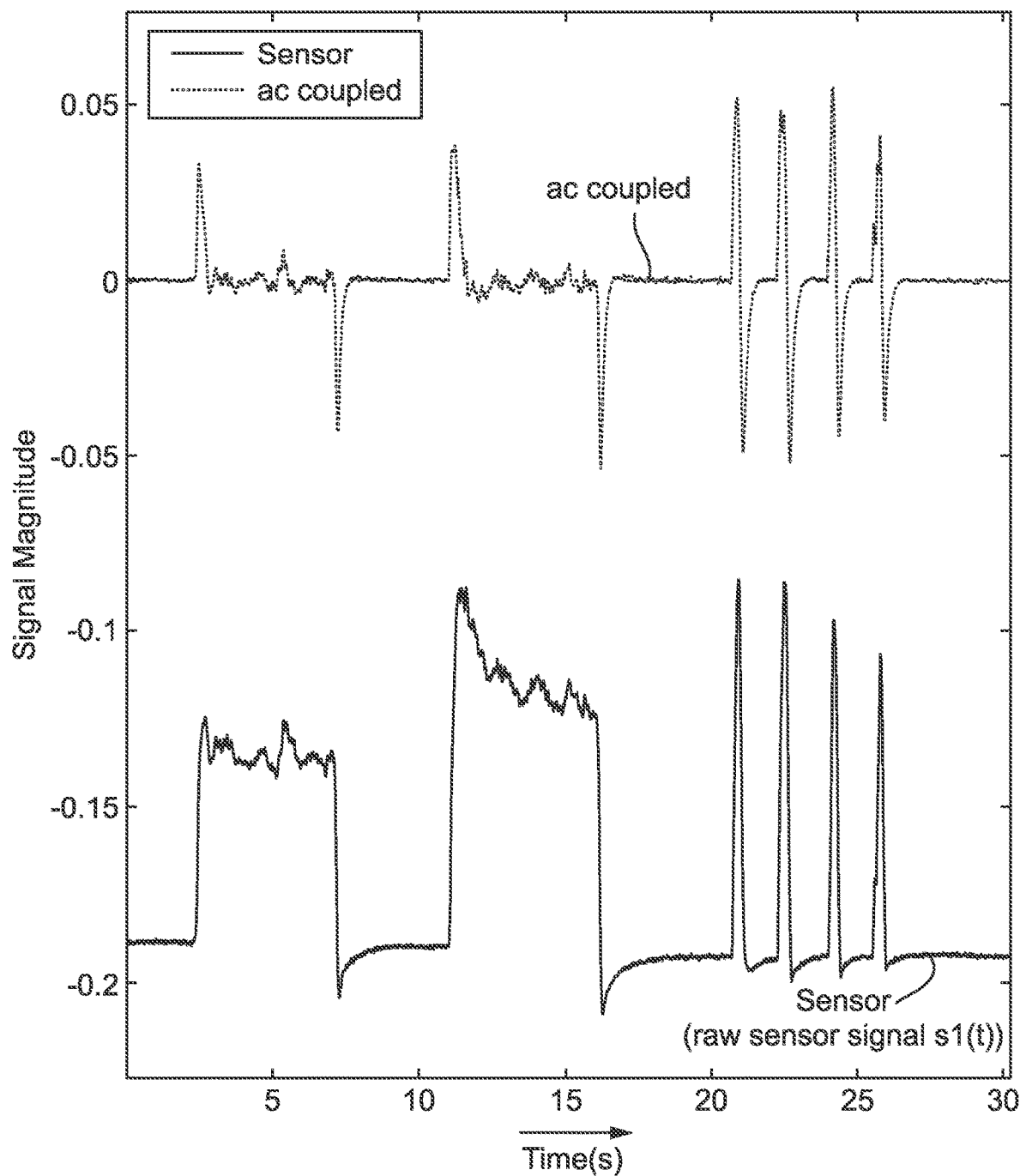

By way of example, FIG. 5 shows a plot (see the solid line) of a raw sensor signal s1(t) from an example host device 100 where N=1, having sensor S1. Also shown (see the dotted line) is the output of a high-pass AC-coupling filter. There are two long button presses from 2 to 7 seconds and from 11 to 16 seconds. There is a series of short button presses from 21 to 26 seconds. In the output of the high-pass AC-coupling filter the baseline of the sensor signal has indeed been removed. The result of the high-pass AC-coupling filter applied to the long button presses however is to produce a short positive pulse at the onset of the long button press, and a short negative pulse at the end of the long button press. This makes it impossible to measure the difference between the sensor signal and the baseline in the middle of the button press. There are similar positive and negative pulses associated with the short button presses.

The present inventors have considered a robust method to identify the slowly varying baseline of a sensor signal separately from the rapid variations due to physical events such as button presses. It is desirable that such a method preserve the shape of the physical events so that their difference with respect to the baseline can be measured.

With the above in mind, FIG. 6A is a schematic diagram of a baseline unit 200 according to an embodiment, and is shown as receiving digital sample streams s1(n) to sN(n), from corresponding force sensors S1 to SN. In the general case, N≥1 as above although it will be apparent from FIG. 6A that N≥2 is also envisaged. The baseline unit 200 may be implemented in the host device 100, for example as, or as part of, the controller 110, and is shown as outputting two sets of signals (streams of samples). In one arrangement the baseline unit 200 may be implemented as program code running on the controller 110.

The first set of signals comprises baseline signals B-s1(n) to B-sN(n), which correspond respectively to sensor signals s1(n) to sN(n). Each baseline signal, e.g. B-s1(n), corresponds to a baseline signal for a given force sensor, in this case S1, and its sensor signal, in this case s1(n). Each baseline signal may therefore indicate the baseline level for its sensor. A stream of sensor samples SS(n) may thus give rise to a corresponding stream of baseline samples BS(n), as indicated.

The second set of signals comprises baseline-corrected signals BC-s1(n) to BC-sN(n), which correspond respectively to sensor signals s1(n) to sN(n). Each baseline-corrected signal, e.g. BC-s1(n), corresponds to a baseline-corrected signal for a given force sensor, in this case S1, and its sensor signal, in this case s1(n). Each baseline-corrected signal may therefore indicate "true" signal level for its sensor.

Taking sensor S1 as an example, it may be said that:

$$BC\text{-}s1(n) = s1(n) - B\text{-}s1(n)$$

A stream of sensor samples SS(n) may thus give rise to a corresponding stream of baseline-corrected samples BCS(n), as indicated.

It will be appreciated that the baseline unit need not generate both the baseline streams and the baseline-corrected streams. For example, the baseline unit might generate only the baseline streams, and pass those baseline streams onto another unit which also receives the sample streams and generates the baseline-corrected streams. In another arrangement, the baseline unit might generate the baseline-corrected streams directly and not output the baseline streams as such.

The baseline unit 200 is shown as comprising a baseline calculation unit 300, which stores (or has access to) a baseline setting 400. In another arrangement, however, the baseline unit 200 may be replaced with a baseline unit 250 as in FIG. 6B provided without the baseline calculation unit 300, and may be configured to output a control signal CNTRL which is used to update a baseline setting 400 which is stored by (or accessed by) a separate baseline calculation unit 300. In that case, the separate baseline calculation unit 300 might also receive the sample streams and generate the baseline streams (shown in simplified form as BS(n)) and/or the baseline-corrected streams (shown in simplified form as BCS(n))).

Of course, even when N≥2, it may be that only one or more of the baseline signals B-s1(n) to B-sN(n) and/or the baseline-corrected signals BC-s1(n) to BC-sN(n) is generated, i.e. in respect of only one or more of the sensors 130.

Figure 7A:
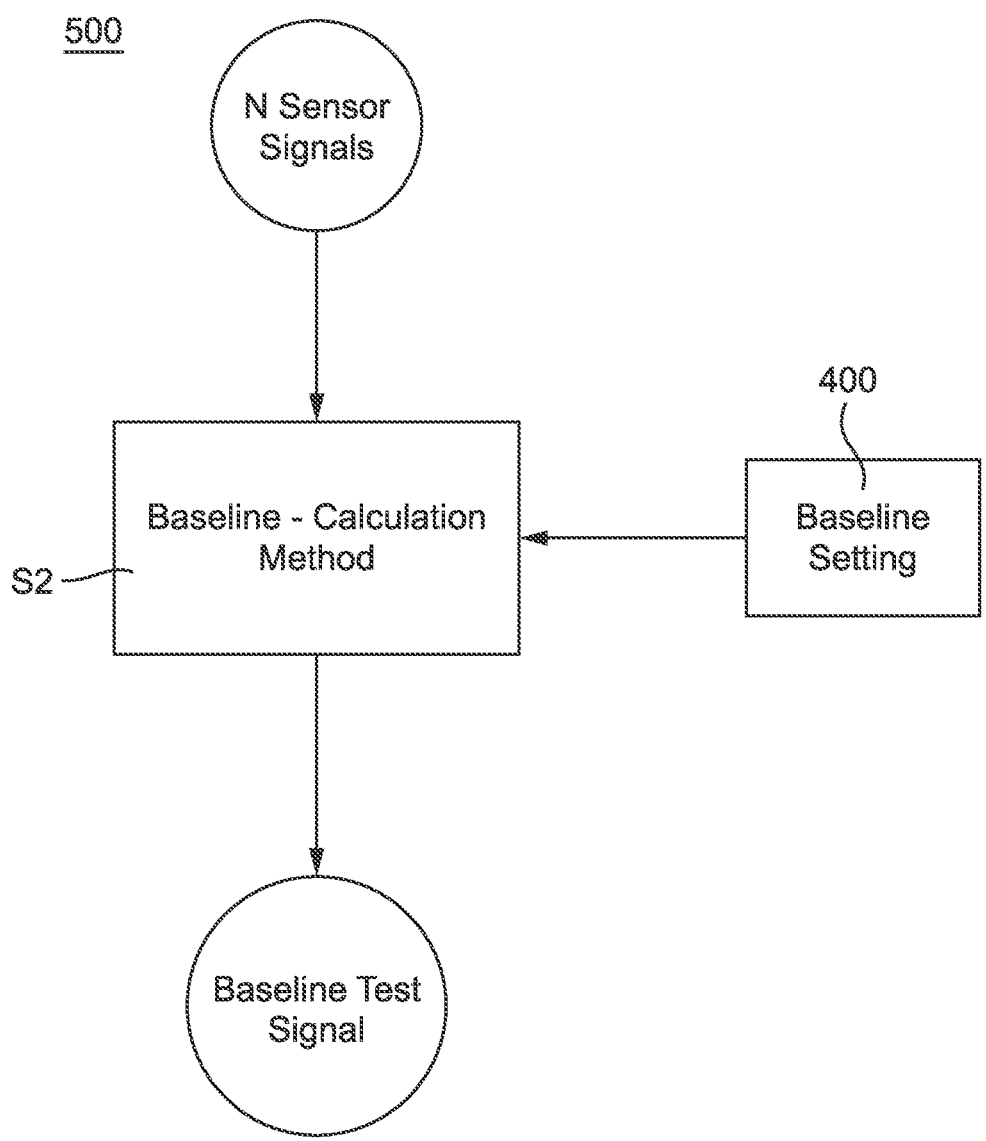
FIGS. 7A to 7C present methods useful for understanding functionality of the baseline units of FIGS. 6A and 6B.
Figure 7B:
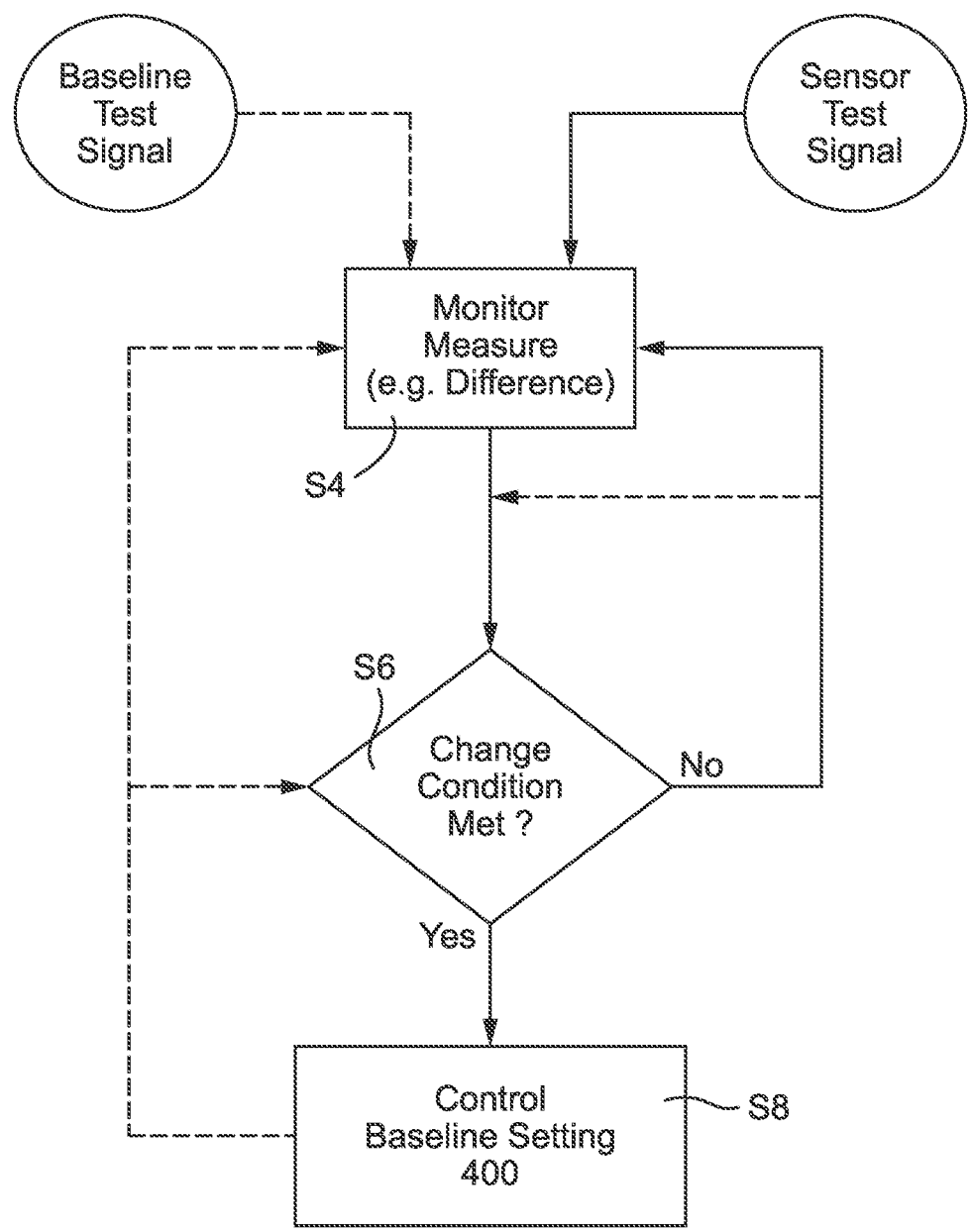
Figure 7C:
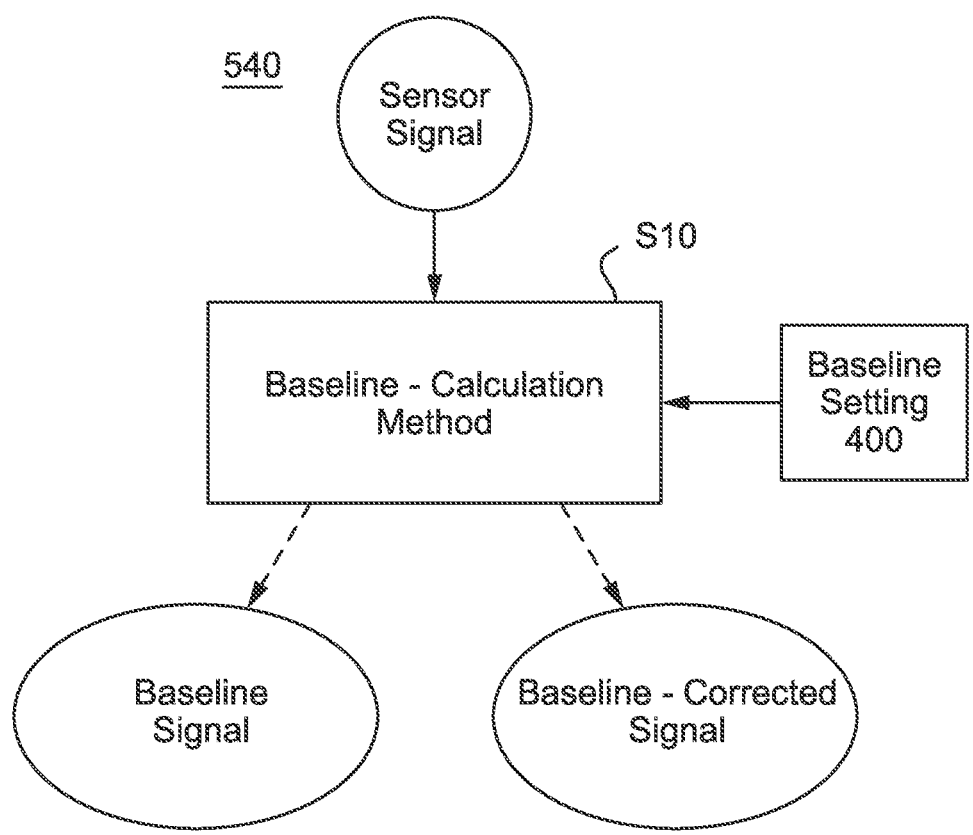

FIGS. 7A to 7C present methods 500, 520 and 540, respectively, useful for understanding functionality of the baseline unit 200. Focus is placed on the baseline unit 200 for simplicity, but it will be appreciated that some of the functionality is also provided by baseline unit 250.

As above, the baseline unit 200 may be configured to store (internally or externally) a baseline setting 400.

Focusing first on method 500 of FIG. 7A, the baseline unit 200 is configured to store (internally or externally) a baseline setting 400, and to calculate (step S2) a baseline test signal from said N sensor signals using a baseline-calculation method, the baseline-calculation method configured by the currently-stored baseline setting 400.

As in the method 520 of FIG. 7B, the baseline unit 200 is configured to monitor (step S4) a difference between a sensor test signal and the baseline test signal (see FIG. 7A), the sensor test signal being the sensor signal (where N=1) or one of said N sensor signals (where N≥2), or a signal derived from the sensor signal (where N=1) or from one or more of said N sensor signals (where N≥2). In dependence upon the difference (step S6), the baseline unit 200 is configured to control (or change) the stored baseline setting (step S8) to control how the baseline test signal is calculated from the N sensor signals (see FIG. 7A).

For example, if a defined change condition is met by the monitored difference (step S6, YES), the baseline setting may be changed (step S8). If, on the other hand, the change condition is not met (step S6, NO), the method may return to step S4 to continue to monitor the difference.

Following the change to the baseline setting in step S8, the method may terminate or may (as indicated by dashed lines) return to step S6 or to step S4. If returning from step S8 to step S6 directly, a further change condition not necessarily dependent on the monitored difference (e.g. the expiry of a given period of time) may be evaluated. In this case, the method may proceed either (step S6, NO) directly back to step S6 to continue evaluating the further change condition as indicated, or (step S6, YES) to step S8 to further change the baseline setting. If returning from step S8 directly to step S4, the difference between the sensor test signal and the baseline test signal may be further monitored, and a further change condition dependent on the difference evaluated in step S6.

Turning to method 540 of FIG. 7C, the baseline unit 200 is configured, for the or each force sensor, to (step S10) calculate a baseline signal (e.g. B-s1(n)) from its sensor signal using the baseline-calculation method (step S10), and/or generate a baseline-corrected signal (e.g. BC-s1(n)) by subtracting its baseline signal (e.g. B-s1(n)) from its sensor signal (e.g. s1(n)). Method 540 may be carried out in respect of each force sensor, or any one or more of them (where N≥2). It will be appreciated that the method of step S10 corresponds to the method of step S2.

Example applications of the methods of FIGS. 7A to 7C will now be considered.

For example, the baseline test signal may be generated based on any one or more of the N sensor signals where N≥2 (or on the sensor signal, where N=1). The sensor test signal may also be one of the N sensor signals where N≥2 (or the sensor signal, where N=1), or a signal derived from one or more of the N sensor signals where N≥2. The change condition evaluated in step S6 may be initially based on the monitored difference of step S4, but may subsequently (after passing via step S8) be based on the monitored difference of step S4 or based on another factor such as the expiry of a time period.

At this juncture, it is noted that the difference monitored in step S4 is one example of a measure of the rate of change of the sensor test signal. That is, if the difference is big then this indicates that the derivative, gradient or rate of change of the sensor test signal is big (and stays big for some amount of time). Any measure of the rate of change of the sensor test signal (e.g. averaged over some time period) may be used as the measure in place of the difference indicated in step S4. Thus, for example, it is not necessary that step S4 be based on the baseline test signal, as indicated by the dashed arrow, and the gradient of the sensor test signal could be monitored.

For convenience of explanation, however, the difference between the sensor test signal and the baseline test signal will be carried forwards as the monitored measure, merely as a running example. Further, the difference will be taken in this example as a difference in magnitude, although differences in gradient and/or frequency spectrum could be considered.

Also in the running example, the baseline-calculation method (see steps S2 and S10) may involve low-pass filtering. For example, the baseline test signal may be obtained by low-pass filtering the sensor test signal. The speed with which the output of the low-pass filter, i.e. the baseline signal, can follow the input sensor signal is then defined (or limited) by the configuration of the low-pass filter, for example (depending on how the filter is implemented) by its time-constant, forgetting factor, filter coefficients or corner frequency, and such a configuration may serve as the baseline setting 400.

Merely as an example, baseline signals may be generated using a baseline tracking equation of the following form:

$$\text{baseline}(n) = \lambda \cdot \text{baseline}(n-1) + (1-\lambda) \cdot x(n)$$

where n is the sample number, baseline(n) is a given baseline signal (such as B-s1(n)), x(n) is the corresponding 'raw' sensor signal (such as s1(n)), and λ is a forgetting factor. Reducing the value of the forgetting factor has the effect of increasing the passband of the low-pass filtering, for example.

For simplicity, however, the time-constant of the filter will be referred to going forwards as the baseline setting 400, however this is of course just an example.

Continuing the low-pass filtering example, when the sensor test signal moves rapidly, such as with a button press, the corresponding baseline test signal necessarily lags behind the sensor test signal. As a result, the sensor test signal separates from the baseline test signal. This of course assumes that the time constant is large enough (e.g. the corner frequency is low enough) for the baseline test signal not to 'keep up' with the sensor test signal.

When this separation, effectively the difference (in magnitude) between the sensor test signal and the baseline test signal (as the example monitored measure), as computed (calculated or determined) relative to the most recently computed baseline test signal value, exceeds a threshold difference (threshold value of the measure) or "escape level difference" (ELD), it may be determined that an initial change condition (step S6) has been met.

One possible change to the baseline setting 400 which may be made in step S8 (following the initial change condition being met in step S6) is to increase the time-constant to a larger value so that the baseline test signal necessarily lags to a greater degree behind the sensor test signal (see FIGS. 7A and 7B). This would then of course impact how baseline signals and/or baseline-corrected signals are generated from a corresponding sensor signal (see FIG. 7C).

For example, the time-constant may be increased to a much larger value, large enough to be equivalent to an infinite time-constant in practice, so that the baseline test signal effectively becomes frozen at its current level. This level may then be substantially maintained until the sensor test signal again returns to a level nearer the baseline test signal, e.g. such that the monitored difference falls below the ELD, at which point the time-constant may be returned to its original value or to another value where the baseline test signal (taken as the output of the low-pass filter) once more tracks or follows the sensor test signal.

One means of freezing or substantially slowing down the output of the low-pass filter is to change its time-constant (e.g. filter coefficients) so that the current state of the filter is maintained or its speed is substantially reduced as above. In this case, the filter time-constant may be taken as the baseline setting 400 also as above. Another means is to override or disable the output of the low-pass filter, in which case the baseline setting 400 may be a value (such as a binary value) indicative of whether the output of the filter is to be overridden.

Where focus is placed repeatedly in method 520 on the monitored difference of step S4, the method 520 may be configured in one arrangement to implement the following pseudo code:

if (difference>ELD1)
      baseline setting=value 1
    else if ((difference>ELD2) && (difference<ELD))
      baseline setting=value 2
    else if (difference<EDL2)
      baseline setting=value 3
    where "difference" is the monitored difference of step S4, ELD1 and ELD2 are given threshold differences or "escape level differences", and values 1, 2 and 3 are defined baseline setting values to be used for the difference ranges of the "difference". Recall that the "difference" is an example of a "measure" as mentioned earlier. It is assumed that ELD1>ELD2, and ELD2 could be 0 in some cases. In the case of low-pass filtering, the values 1 to 3 could be time-constants, or corner frequencies, etc. It will become apparent that there are various ways that the sensor test signal and the baseline test signal may be arrived at, and thus various ways that the monitored difference of step S4 may be arrived at.

As a first example application of the methods of FIGS. 7A to 7C, using low-pass filtering as the baseline-calculation method, N=1 for simplicity. In FIG. 7A, the baseline test signal may be taken as the baseline signal for the single sensor 130 as calculated in FIG. 7C, so that the methods 500 and 540 correspond to one another, and the time-constant of the low-pass filtering for example taken as the baseline setting 400. Looking at FIG. 7B, the sensor signal for the single sensor may be taken as the sensor test signal, with the difference between the sensor signal and the baseline signal thus being the difference monitored in step S4. Further, the initial change condition considered at step S6 may be taken as the ELD mentioned above.

Figure 8:
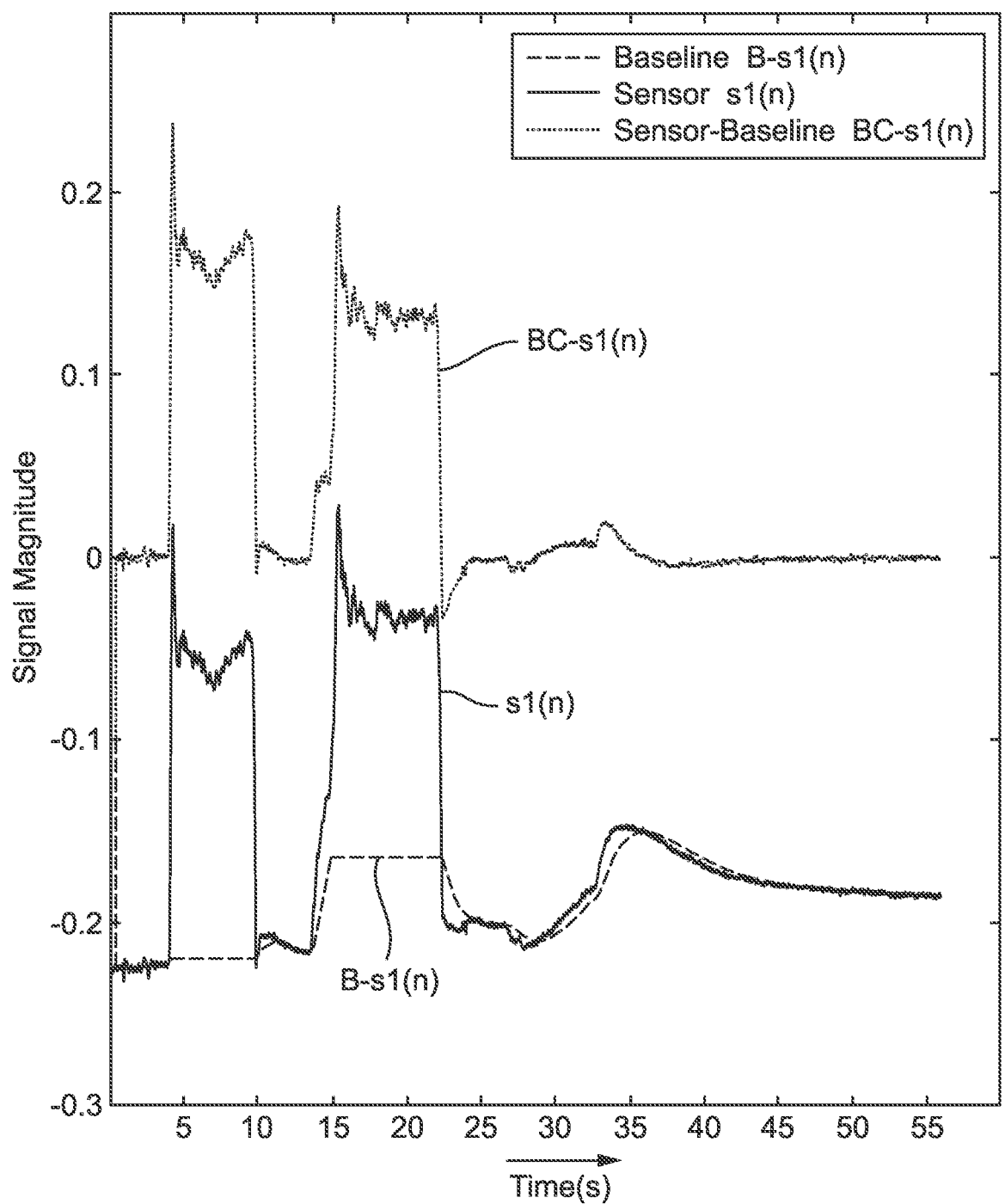
FIGS. 8 to 13 show plots of example signals useful for understanding applications of the methods of FIGS. 7A to 7C.

FIG. 8 shows a plot of example signals corresponding to this first example application. A raw sensor signal s1(n) (see the solid line) from an example host device 100 where N=1, having sensor S1, is shown. The dashed line shows the baseline signal B-s1(n) produced by such low-pass filtering and the dotted line shows the corresponding baseline-corrected signal BC-s1(n), i.e. corresponding to "sensor signal−baseline signal".

The sensor signal s1(n) presents two long button presses, approximately from 4 to 10 seconds and from 15 to 22 seconds, respectively. Between 27 and 35 seconds, a heat gun is applied to the sensor S1 causing a gradual rise and then fall of the baseline.

In this example, the ELD is set to a value of 0.06 and the time-constant of the low pass filter is set to 1 second. Further, when the ELD is exceeded the time-constant is changed to cause the current value of the baseline signal (also, here, the baseline test signal) to be maintained, i.e. to 'freeze' the baseline. Here, therefore, the baseline signal freezes during the two button presses when s1(n)−B-s1(n) (sensor test signal−baseline test signal) exceeds the ELD. The second button press has a slower rise time than the first, so the freeze occurs at a higher level. The ELD is large enough that it is not exceeded during the temperature change due to the heat gun. Setting the ELD in this way can be beneficial as it is desirable for the baseline signal (also, here, the baseline test signal) to track the sensor signal (also, here, the sensor test signal), rather than freeze, during temperature changes.

As a second example application of the methods of FIGS. 7A to 7C, again using low-pass filtering as the baseline-calculation method, N=4 as an example where N≥2. In FIG. 7A, the baseline test signal may be taken as the sum of baseline signals for the individual sensors as calculated in FIG. 7C, and the time-constant of the low-pass filtering for example taken as the baseline setting 400. Looking at FIG. 7B, the sensor test signal may similarly be taken as the sum of the sensor signals for the individual sensors. The difference monitored in step S4 may thus be considered as "the sum-of-sensor signals−the sum-of-baseline signals". The initial change condition considered at step S6 may be taken as the ELD as previously.

Thus, the baseline test signal (and each of the individual baseline signals) is produced in a manner similar to the first example application described above. However, rather than freeze a baseline signal for an individual sensor based on the ELD considered for that sensor, the ELD is evaluated based on the sum of multiple sensor signals (the sensor test signal) and the baseline test signal is computed for that sum-of-sensors signal. Incidentally, although the baseline test signal is described here as the sum of baseline signals for the individual sensors as calculated in FIG. 7C, the baseline test signal could be calculated by low-pass filtering the sensor test signal (here, the sum of the sensor signals for the individual sensors).

Figure 9:
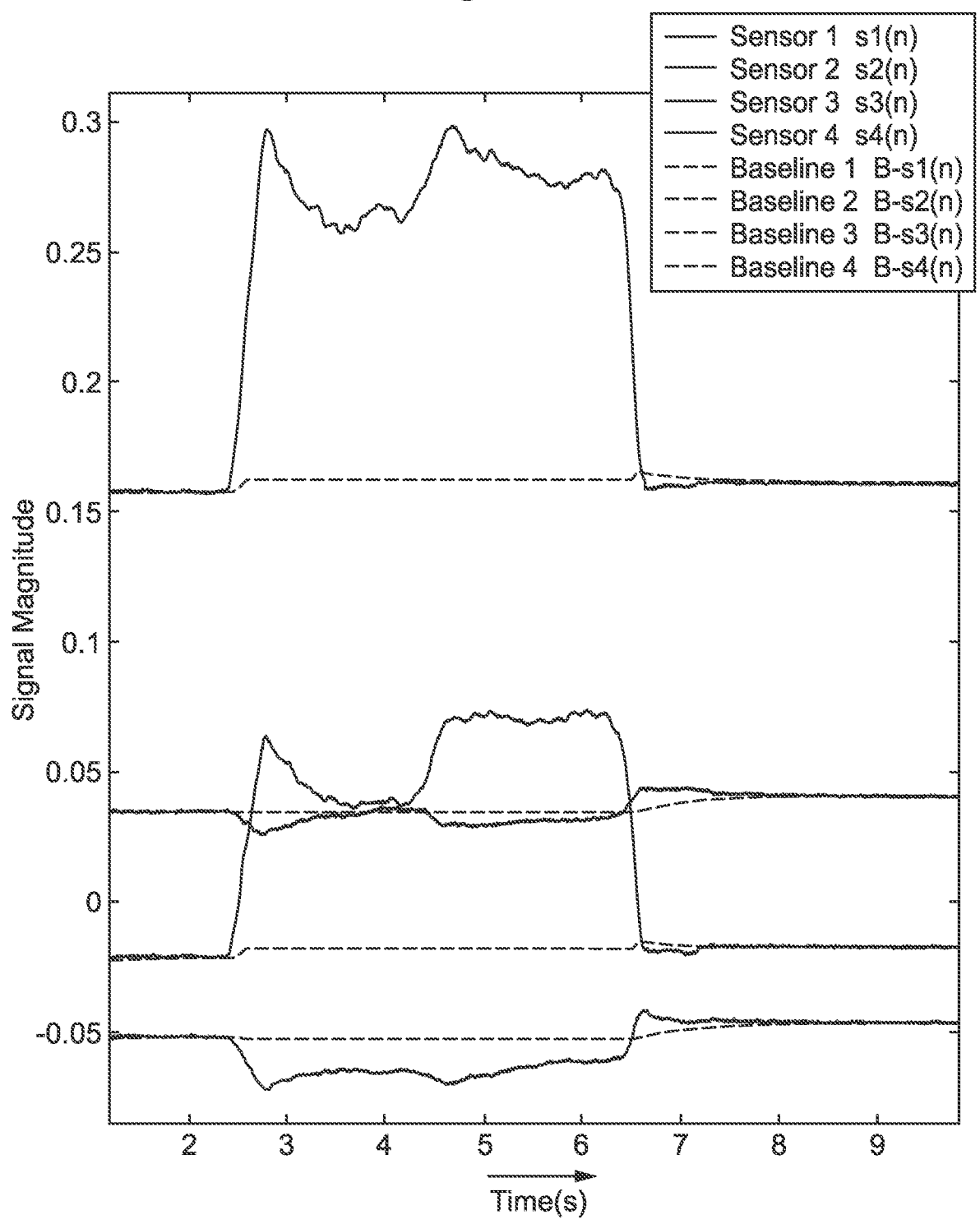
Figure 10:
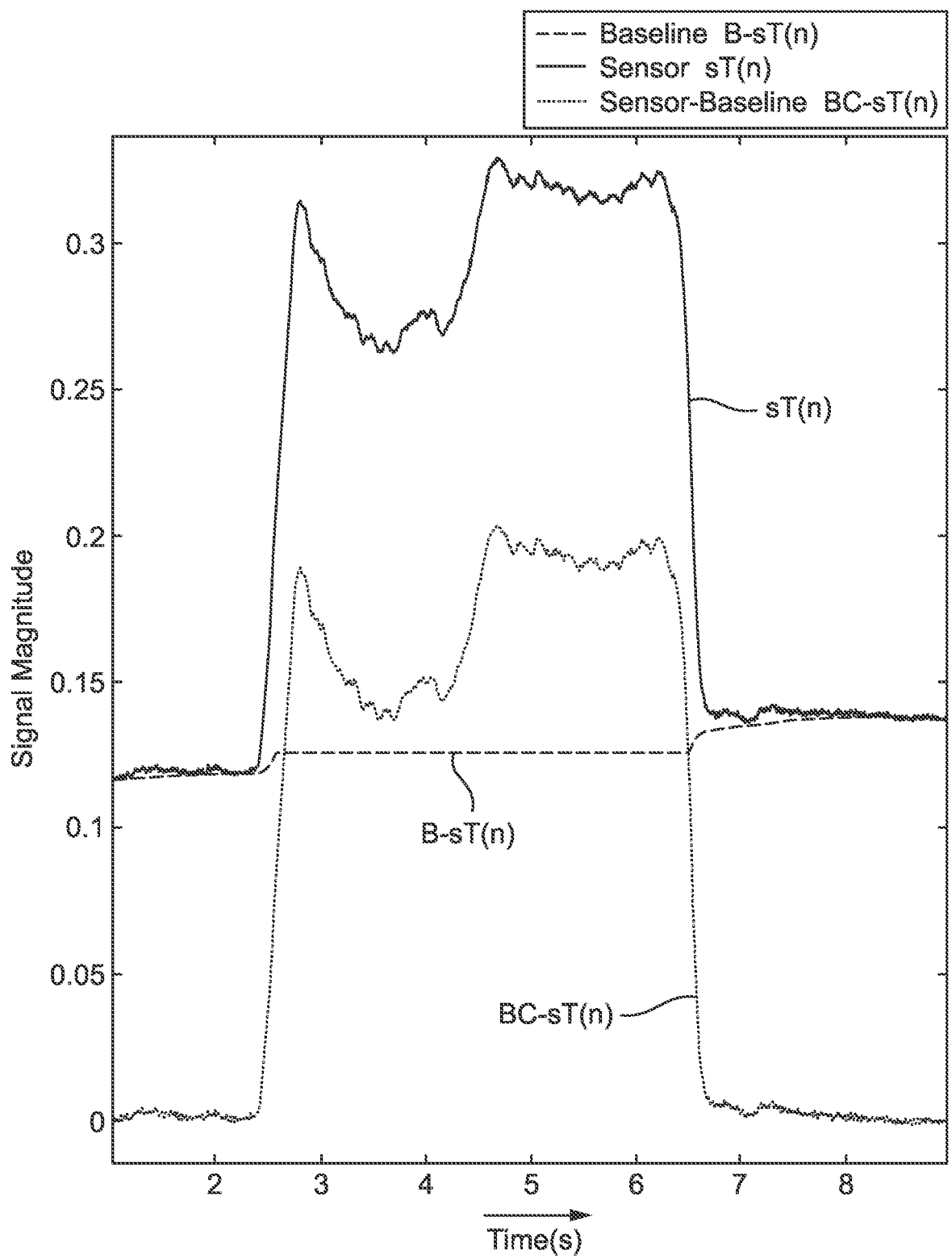

FIGS. 9 and 10 show plots of example signals corresponding to this second example application.

In FIG. 9, the solid lines show the responses (raw sensor signals) of four sensors S1 to S4 from an example host device 100 where N=4. It is assumed here that the sensors S1 to S4 are arranged in row on e.g. a metal strip forming part of the side of the enclosure 101 of the device 100. For example, this side may correspond to the edge of a smartphone. The plots show the response to a physical force, e.g. a finger pushing at one location of the metal strip. The dashed lines show the baseline signals for each of the four sensors. Two of the sensor signals deflect in the positive direction with respect to their baseline signals, while two of the sensor signals deflect in the negative direction.

If the sensor signals were dealt with individually as in the first example application, then each baseline signal would be frozen when (sensor signal−baseline signal)>ELD. In this case, assuming that the ELD is a signed and positive value, then the baseline signals for sensors whose sensor signals deflect negatively (so as to fall below their baseline signals) would not be frozen (as the negative difference would be less than the positive ELD).

However, if the 'sum of the four sensors' is considered as in this second example application, the difference calculated (sum-of-sensor signals−sum-of-baseline signals) will be positive and potentially greater than the positive ELD, where the negative deflections are relatively small compared with the positive deflections. Thus, where negative deflections are possible and taken into account, it may be desirable to control the baseline setting 400 based on the "sum-of" sensor test signal and baseline test signal as in this example application.

In FIG. 10, the solid line is the sensor test signal sT(n), corresponding to the sum of sensor signals, the dashed line is the baseline test signal B-sT(n), corresponding to the sum-of-baseline signals, and the dotted line is the corresponding baseline-corrected signal BC-sT(n), corresponding to the "sum-of-sensor signals−sum-of-baseline signals".

In this second example application, the baseline signals in FIG. 9 are all frozen when the baseline test signal in FIG. 10 is frozen, i.e. when the difference between the sensor test signal and the baseline test signal exceeds the ELD.

Of course, freezing the baselines is just an example as explained earlier. Also, taking the sum of the sensor (or baseline) signals is also just an example, and an average could be taken instead of a sum. As another variation, each sensor sample SS(n) (made up of values of sensor signals) may be considered to define a sample vector SV(n) in N-dimensional vector space as described earlier in connection with FIG. 3, and baseline samples BS(n) may be considered equivalently to define a baseline vector BV(n) in N-dimensional vector space. In this case, the difference monitored in step S4 may be taken to be the Euclidean distance between the sample vector SV(n) and baseline vector BV(n), i.e. between locations in N-dimensional space defined by those vectors. If the Euclidean distance is greater than a suitably chosen ELD, all baseline signals may be frozen as in FIG. 9.

A third example application of the methods of FIGS. 7A to 7C is the same as the second example, except that a case where the sum-of-sensor signals itself can be substantially negative or positive is addressed.

Figure 11:
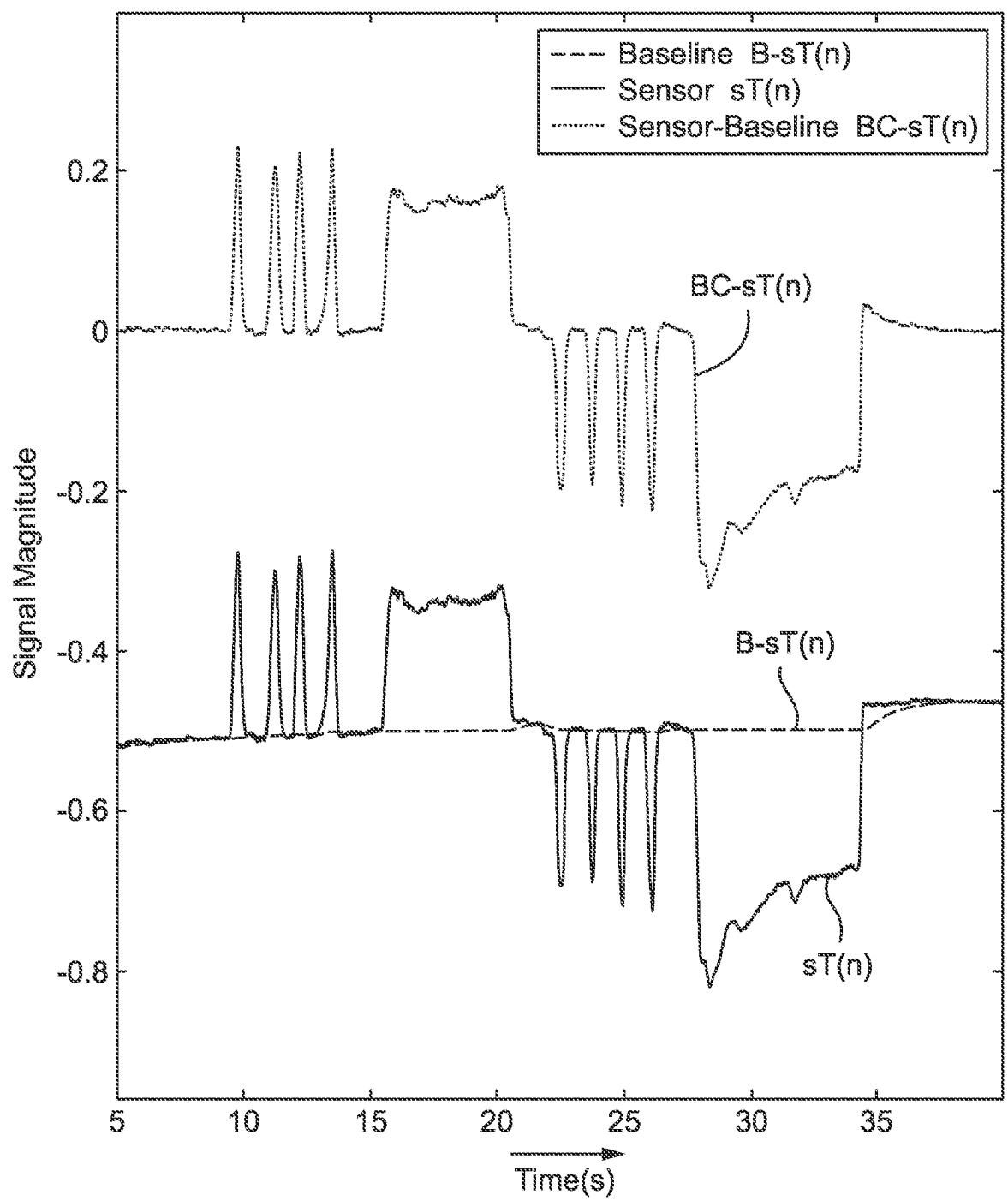

FIG. 11 shows a plot of example signals corresponding to this third example application, and like the second example relates to an example host device 100 where N=4. Here the signals for the individual sensors are not shown for simplicity. Similarly to FIG. 10, the solid line is the sensor test signal sT(n), corresponding to the sum of sensor signals, the dashed line is the baseline test signal B-sT(n), corresponding to the sum-of-baseline signals, and the dotted line is the corresponding baseline-corrected signal BC-sT(n), corresponding to the "sum-of-sensor signals−sum-of-baseline signals".

The large positive sensor test signal excursions are due to the usual button presses of the enclosure 101 adjacent to the sensors 130 (e.g. on a smartphone chassis), and the large negative excursions are due to squeezing or twisting the enclosure 101. In this example application, rather than freeze the baseline test signal (and the individual baseline signals) when the signed result of "sum-of-sensor signals−sum-of-baseline signals" exceeds the signed EDL, the baseline test signal (and the individual baseline signals) are frozen when the absolute value of "sum-of-sensor signals−sum-of-baseline signals" exceeds the EDL (which may be an unsigned absolute value itself).

Thus, as is shown in FIG. 11, the baseline test signal B-sT(n) freezes for both the large positive and negative excursions. This would then follow through to freezing of the individual baseline signals in line with FIG. 7C. As before, instead of 'sum-of' values, average values or Euclidean distances may be considered. Also, absolute values for the monitored difference and the ELD may be used in the first example application to take account of negative excursions.

A fourth example application of the methods of FIGS. 7A to 7C is the same as the third example, except that a problem that can occur when the sum-of-sensor signals can have large negative and positive excursions is addressed.

Figure 12:
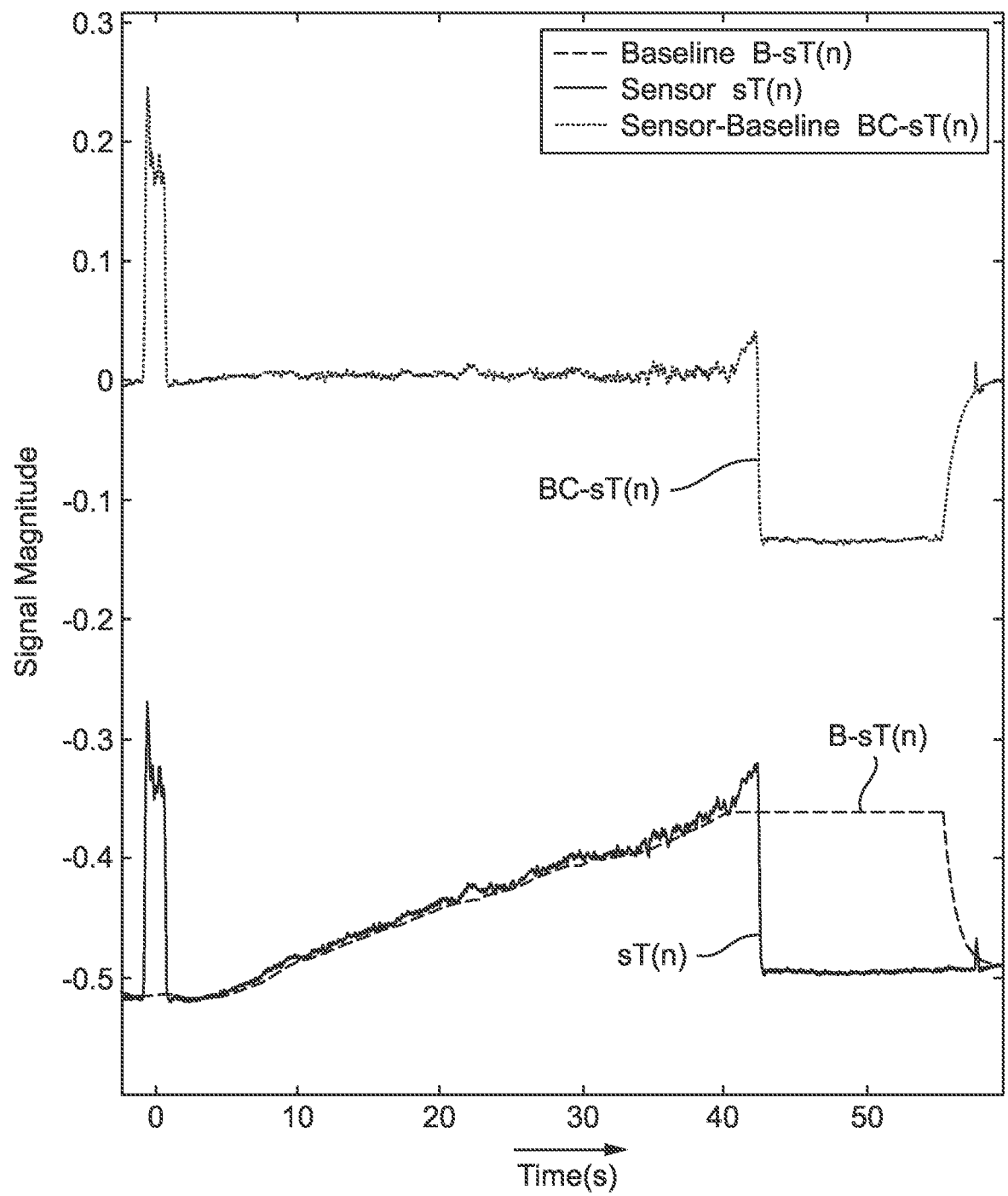

FIG. 12 shows a plot of example signals corresponding to this fourth example application, and like the third example relates to an example host device 100 where N=4. Here, again, the signals for the individual sensors are not shown for simplicity. Similarly to FIG. 11, the solid line is the sensor test signal sT(n), corresponding to the sum of sensor signals, the dashed line is the baseline test signal B-sT(n), corresponding to the sum-of-baseline signals, and the dotted line is the corresponding baseline-corrected signal BC-sT(n), corresponding to the (sum-of-sensor signals−sum-of-baseline signals).

The solid line shows a normal short button press at around 0 seconds. Then from 1 to 42 seconds a very long gradual button press is shown. For the benefit of explanation, the button press is so gradual, in fact, that the level change resembles that which might occur due to temperature variation. The slow change allows the sum-of-baseline signals to track the sum-of-sensor signals through almost the entire duration of the gradual button press. The tracking occurs from 1 to 40 seconds because, during that period, the absolute value of the "sum-of-sensor signals−sum-of-baseline signals" does not exceed the ELD.

At 42 seconds, the button is suddenly released causing the sum-of-sensor signals to rapidly return to the 'true' sum-of-baseline signals level. However, if the technique described in the third example implementation is employed, then immediately after 42 seconds the absolute value of the "sum-of-sensor signals−sum-of-baseline signals" exceeds the ELD, and the baseline test signal is frozen at the 'incorrect' high level (with the effect that individual baseline signals may be frozen also at 'incorrect' levels). At this point there is a danger that the baseline test signal (and individual baseline signals) will become permanently locked (or locked for too long) at the incorrect level.

Such a lockup situation may be unlikely because it requires a very long button press with a very gradual increase in force over a long period of time, so as to effectively fall within the passband of the low-pass filtering. Nevertheless, it is desirable to resolve this lockup condition if it occurs.

One possible way to resolve such a lockup condition is to evaluate a second change condition in step S6 (see FIG. 7B) after the initial change to the baseline setting 400 is made in step S8, which second change condition is not (at least not solely) dependent on the difference monitored in step S4.

For example, the second change condition could be the expiry of a time period following when step S8 was first carried out, and when this is evaluated as true (step S6, YES)

a second instance of step S8 could be carried out to change the baseline setting 400 back to a value where the lockup condition could be exited.

Another example of the second change condition could be based on observed temporal variation in the sensor test signal (or any of the sensor signals).

Figure 13:
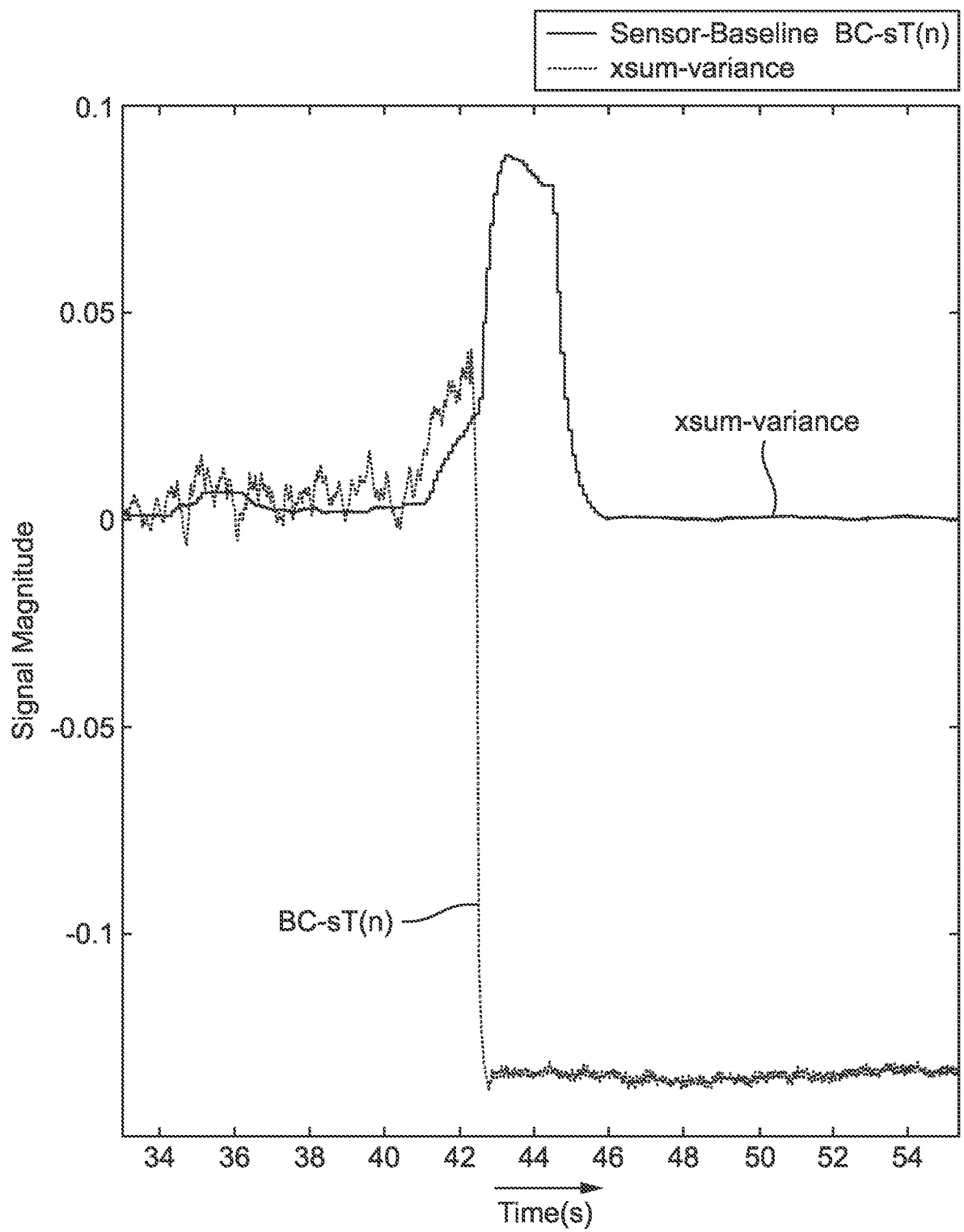

FIG. 13 is a portion of the plot of FIG. 12, showing in particular a portion of the baseline-corrected signal BC-sT (n) where the button is suddenly released causing the sum-of-sensor signals to rapidly return to the 'true' sum-of-baseline signals level. The solid line in FIG. 13 is an additional signal (not shown in FIG. 12) called xsum-variance. It is the sum-of-squares of the sum-of-sensor signals over a sliding window of duration approximately 2 seconds, as an example, and serves as an example measure of the temporal variance of the sum-of-sensor signals, or sT(n), in FIG. 12.

Looking back to FIG. 12, from 1 to 42 seconds the sum-of-sensor signals, or sT(n), has a relatively high degree of local variation. This is because it is difficult if not impossible for a human being to press a piece of material, especially with gradually increasing force, without introducing a certain amount of local jitter. From e.g. 42 to 50 seconds, after the force has been released at 42 seconds, the jitter or temporal variance of the sum-of-sensor signals, or sT(n), is reduced.

This change in temporal variance can be appreciated from FIG. 13. From about 34 seconds to 40 seconds the xsum-variance is about 0.01. Near the large transition at 42 seconds the xsum-variance goes to a high value, and then after 46 seconds it reaches a value much lower than 0.01. When this occurs, it can be assumed that the low variance is an indication that the sum-of-sensor signals has returned to its neutral relaxed position, with no applied force. This change in temporal variance can be used to 'force' a release of the lockup condition, i.e. as a second change condition at a second instance of step S6 to allow the method 520 to proceed to a second instance of step S8 at which the baseline setting 400 may be reverted to a value which allows the baseline test signal (and each individual baseline signal) to converge to its 'true' value (representing the neutral relaxed position). This is shown to occur at 56 seconds in FIG. 12.

Figure 14:
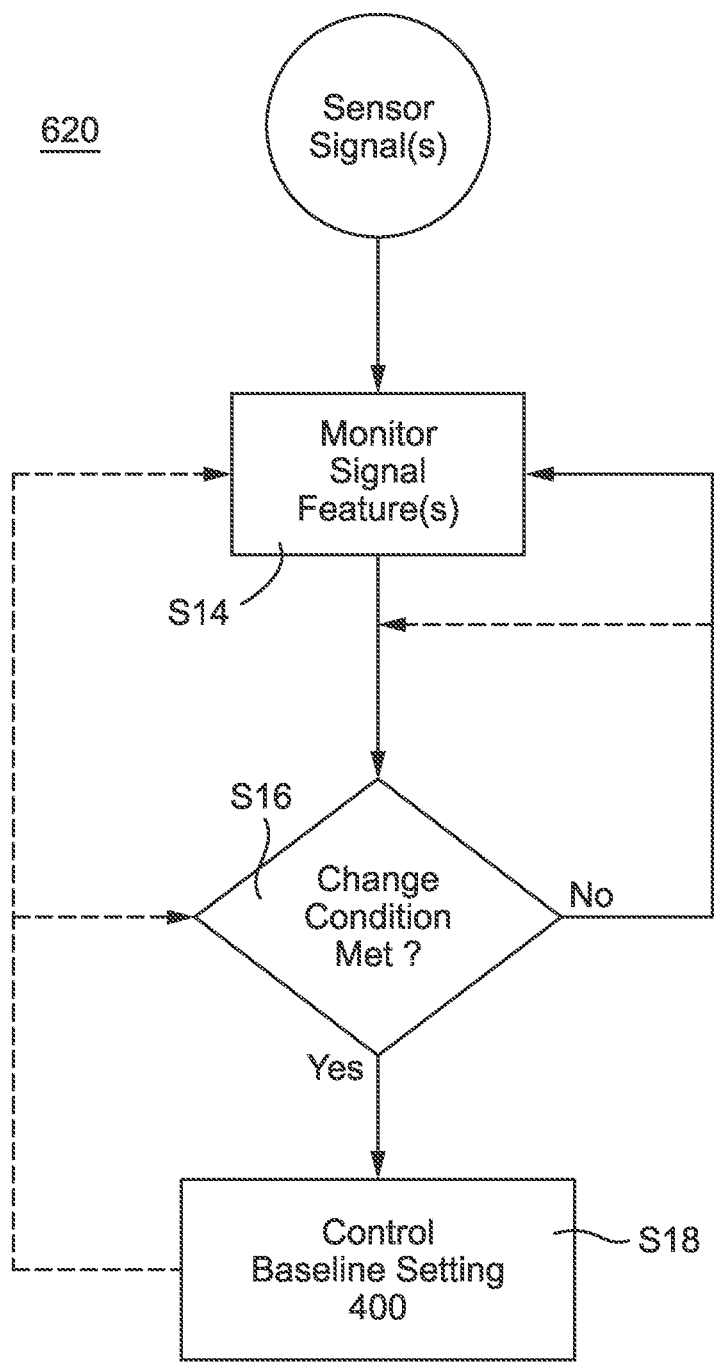
FIG. 14 presents a method useful for understanding other functionality of the baseline units of FIGS. 6A and 6B.

FIG. 14 presents a method 620 which may be considered a variation of method 520 of FIG. 7B, and is useful for understanding a variation in the functionality of the baseline unit 200. Focus is again placed on the baseline unit 200 for simplicity, but it will be appreciated that some of the functionality is also provided by baseline unit 250.

As above, the baseline unit 200 may be configured to store (internally or externally) a baseline setting 400. However, it may be that at least one signal feature of a sensor signal (or of a plurality of sensor signals) is monitored to determine when to change the baseline setting, rather than considering the difference of step S4 of FIG. 7B. For example, a baseline test signal may be calculated based on the N sensor signals using a baseline-calculation method as before, the baseline-calculation method configured by the currently-stored baseline setting 400, but this need not be considered when determining whether to change the baseline setting 400.

Looking at FIG. 14, the baseline unit 200 may be configured to monitor (step S14) at least one feature of a sensor test signal, the sensor test signal being the sensor signal (where N=1) or one of said N sensor signals (where N≥2), or a signal derived from the sensor signal (where N=1) or from one or more of said N sensor signals (where N≥2). In dependence upon the at least one feature (step S16), the baseline unit 200 may be configured to control or change (step S18) the stored baseline setting 400 to control how the baseline test signal is calculated from said N sensor signals. The at least one feature may comprise temporal variance of the sensor test signal.

For example, if a defined change condition is met by the monitored at least one feature (step S16, YES), the baseline setting may be changed (step S18). If, on the other hand, the change condition is not met (step S16, NO), the method may return to step S14 to continue to monitor the difference.

Following the change to the baseline setting in step S18, the method may terminate or may (as indicated by dashed lines) return to step S16 or to step S14. If returning from step S18 to step S16 directly, a further change condition not necessarily dependent on the monitored at least one feature (e.g. the expiry of a given period of time) may be evaluated. In this case, the method may proceed either (step S16, NO) directly back to step S16 to continue evaluating the further change condition as indicated, or (step S16, YES) to step S18 to further change the baseline setting. If returning from step S18 directly to step S14, the at least one feature may be further monitored, and a further change condition evaluated in step S16.

In a fifth example application, a problem is addressed that can occur when temperature variations, such as those produced by a heat gun, cause large deflections (excursions) of sensor signals.

Referring back to FIG. 4, it can be seen that, where N≥2 and there is e.g. an array of multiple sensors 130 (in this case N=4) implemented in e.g. a side of the host device 100, button presses generally cause some sensor signals to deflect in a positive direction and some in a negative direction. However, from 28 to 41 seconds, when a heat gun is applied to the sensors, the result is to move all of the sensor signals in the same direction (upwards in this case). Thus, changes due to temperature have a strong common mode for the array of sensors 130, whereas button presses possibly do not. At each time sample, a new sample vector SV(n) corresponding to a sensor sample SS(n) of sensor signal values at that sample time is obtained. The common mode could be removed from the sensor signals by subtracting the mean of the sensor vector at each time sample from the vector itself.

Figure 15:
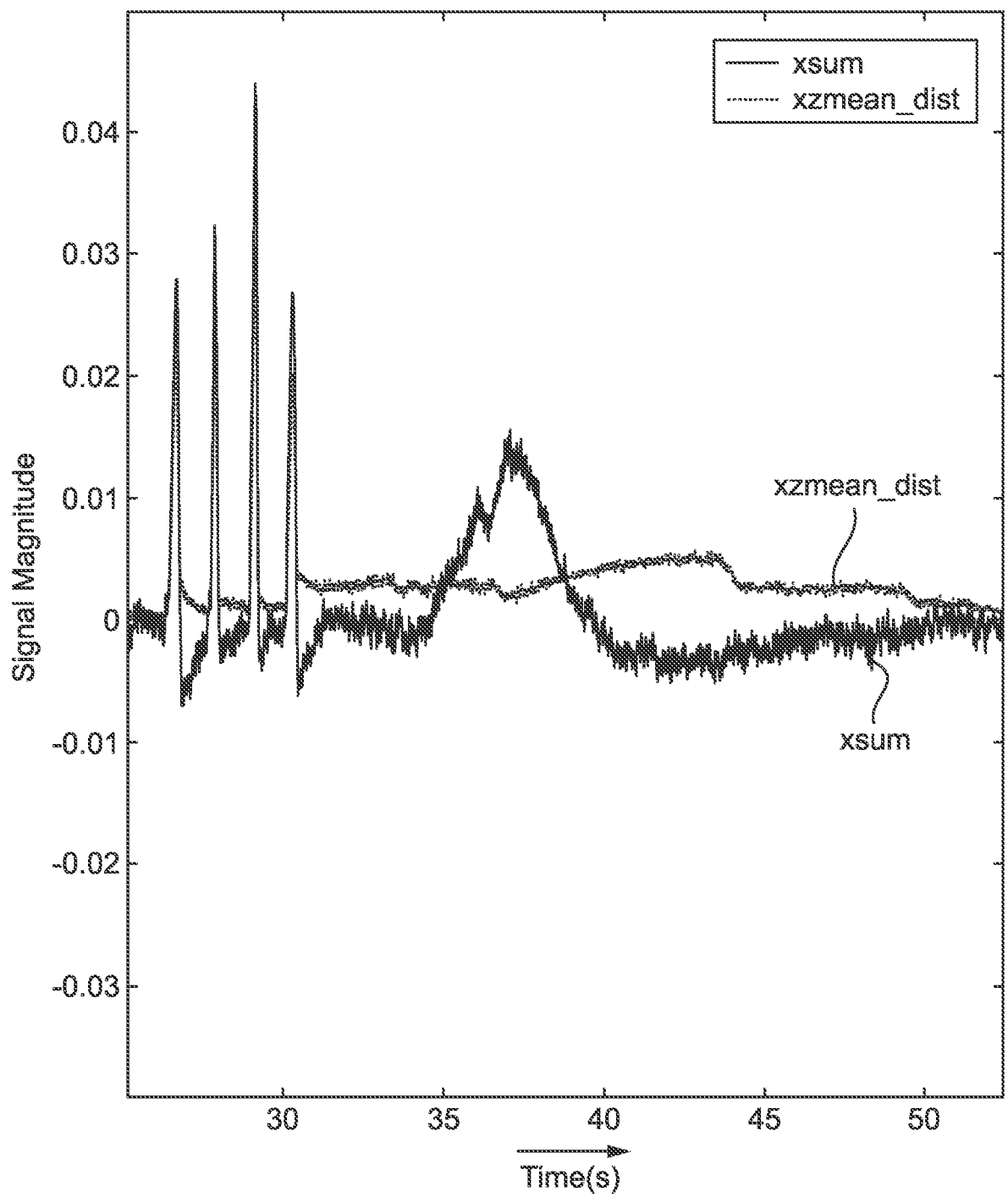
FIG. 15 shows a plot of example signals useful for understanding applications of the methods of FIGS. 7A to 7C.

FIG. 15 shows a plot of example signals corresponding to this fifth example application, assuming N≥2. For example, it could be that N=4. The solid line shows xsum which is the sum-of-sensor signals and the dotted line shows xzmean_dist, which is the sum-of-sensors signal with the common mode removed.

From 27 to 31 seconds there are 4 fast button presses. From 34 to 37 seconds a heat gun is applied. For the button presses, the response of xzmean_dist is about 75% that of xsum. However, for when the heat gun is applied, the response of xzmean_dist is about 20% that of xsum (note that the corresponding baseline signals, not shown, are not the same for the two signals shown). Rather than basing the decisions to freeze the baselines on xsum, as described earlier, the decisions can be based on xzmean_dist, where the common mode has been removed. This, in turn allows a reduction in the time-constant needed to allow the baseline signals to follow changes in temperature, since they are smaller and more gradual with xzmean_dist. This, in turn, means that a more gradual and longer press would be needed to enter the potential lockup condition discussed earlier, making the lockup condition less likely to occur.

Although the baseline setting has been described in arrangements above as being applied in common across sensor signals, values of the baseline setting may comprise component values per force sensor. The above arrangements will be understood accordingly. For example, the baseline unit may be configured, for each force sensor, to calculate its baseline signal using the baseline-calculation method as configured by its corresponding component value of the currently-stored baseline setting. That is, the baseline signals may be calculated differently from one another, i.e. dealt with on a per sensor signal basis.

The skilled person will recognise that the force sensors referred to herein are an example type of sensor, and that the techniques described herein may be applied to sensor systems having sensors in general. As such, references to a force sensor may be replaced by references to a sensor or to an electrical or electronic sensor or to an input transducer.

The skilled person will recognise that some aspects of the above described apparatus (circuitry) and methods may be embodied as processor control code, for example on a non-volatile carrier medium such as a disk, CD- or DVD-ROM, programmed memory such as read only memory (Firmware), or on a data carrier such as an optical or electrical signal carrier. For example, the baseline unit 200 or 250 may be implemented as a processor operating based on processor control code. As another example, the controller 110 may be implemented as a processor operating based on processor control code.

For some applications, such aspects will be implemented on a DSP (Digital Signal Processor), ASIC (Application Specific Integrated Circuit) or FPGA (Field Programmable Gate Array). Thus the code may comprise conventional program code or microcode or, for example, code for setting up or controlling an ASIC or FPGA. The code may also comprise code for dynamically configuring re-configurable apparatus such as re-programmable logic gate arrays. Similarly, the code may comprise code for a hardware description language such as Verilog TM or VHDL. As the skilled person will appreciate, the code may be distributed between a plurality of coupled components in communication with one another. Where appropriate, such aspects may also be implemented using code running on a field-(re)programmable analogue array or similar device in order to configure analogue hardware.

Some embodiments of the present invention may be arranged as part of an audio processing circuit, for instance an audio circuit (such as a codec or the like) which may be provided in a host device as discussed above. A circuit or circuitry according to an embodiment of the present invention may be implemented (at least in part) as an integrated circuit (IC), for example on an IC chip. One or more input or output transducers (such as a force sensor 130) may be connected to the integrated circuit in use.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in the claim, "a" or "an" does not exclude a plurality, and a single feature or other unit may fulfil the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office (USPTO) and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. A baseline unit for use in a sensor system, the sensor system comprising N force sensors which output N sensor signals, respectively, where N≥1, the baseline unit configured to:
   monitor a measure of a rate of change of a sensor test signal, the sensor test signal being one of said N sensor signals or a signal derived from one or more of said N sensor signals; and
   in dependence upon the measure of the rate of change, control a stored baseline setting to control how a baseline test signal is calculated from said N sensor signals using a baseline-calculation method, the baseline-calculation method configured by the currently-stored baseline setting.

2. The baseline unit as claimed in claim 1, configured to:
monitor a difference between the sensor test signal and the baseline test signal as the measure of the rate of change of the sensor test signal; and
control the stored baseline setting in dependence upon the difference to control how the baseline test signal is calculated from said N sensor signals.

3. The baseline unit as claimed in claim 1, configured to set the stored baseline setting at different values for different ranges of the measure.

4. The baseline unit as claimed in claim 1, configured to change the stored baseline setting when a defined change condition is met.

5. The baseline unit as claimed in claim 4, wherein said change condition comprises an increase in the measure to a value above a threshold.

6. The baseline unit as claimed in claim 5, wherein:
the measure and the threshold are signed values, and the baseline unit is configured to determine that the measure exceeds the threshold when the measure and the threshold have the same sign as one another and the magnitude of the measure is larger than the magnitude of the threshold; or
the baseline unit is configured to determine that the measure exceeds the threshold when an absolute value of the measure is larger than an absolute value of the threshold.

7. The baseline unit as claimed in claim 5, wherein said change to the stored baseline setting is a first change from a below-threshold value to an above-threshold value, and wherein the baseline unit is configured to:
after making said first change to the baseline setting, determine whether at least one defined further-change condition is met; and
when it is determined that a further-change condition is met, further change the stored baseline setting,
optionally wherein at least one said further change changes the stored baseline setting to a value closer to the below-threshold value or to the below-threshold value.

8. The baseline unit as claimed in claim 7, wherein said threshold is a first threshold, and wherein each further-change condition comprises:
the expiry of a defined time period, optionally measured from when the first change is made or from when the preceding change is made; and/or
an increase in the measure to a value above a second threshold; and/or
a reduction in the measure to a value below a third threshold; and/or
a reduction in temporal variance or jitter in the sensor test signal, or in any of the sensor signals, from a high value above a corresponding temporal-variance threshold to a low value below that temporal-variance threshold.

9. The baseline unit as claimed in claim 1, wherein:
the baseline-calculation method comprises low-pass filtering defined by a filter parameter; and
the baseline setting defines a value of the filter parameter;
optionally wherein the filter parameter comprises a time constant, a forgetting factor and/or a corner frequency which defines the low-pass filtering, such as a passband of the low-pass filtering.

10. The baseline unit as claimed in claim 9, configured, when the measure exceeds a threshold, to change the stored baseline setting to change a size of the passband of the low-pass filtering from a first size to a second size, smaller in frequency bandwidth than the first size,
optionally wherein the second size is sufficient to substantially maintain a value of the baseline test signal or to reduce a rate of change of the baseline test signal, optionally to substantially zero.

11. The baseline unit as claimed in claim 9, configured, when the measure exceeds a threshold, to change the stored baseline setting to a setting which disables or overrides an output of the low-pass filtering and substantially maintains a value of the baseline test signal.

12. The baseline unit as claimed in claim 1, wherein the sensor test signal is the sensor signal for a given force sensor of the sensor system or a signal derived therefrom, and the baseline unit is configured to calculate the baseline test signal as a baseline signal for that force sensor from the sensor test signal using the baseline-calculation method.

13. The baseline unit as claimed in claim 1, wherein:
$N \geq 2$;
values of the baseline setting each comprise component values per force sensor; and
the baseline unit is configured, for each force sensor, to calculate its baseline signal using the baseline-calculation method as configured by its corresponding component value of the currently-stored baseline setting.

14. The baseline unit as claimed in claim 12, wherein:
$N \geq 2$;
the given force sensor is a first force sensor of the sensor system; and
the baseline unit is configured to calculate a baseline signal for a second force sensor of the sensor system from its sensor signal using the baseline-calculation method or a method derived therefrom.

15. The baseline unit as claimed in claim 1, configured to calculate the sensor test signal based on a combination of the N sensor signals, where $N \geq 2$.

16. The baseline unit as claimed in claim 15, configured to calculate the baseline test signal from the sensor test signal using the baseline-calculation method; and/or
calculate a baseline signal for at least one of the force sensors from its sensor signal using the baseline-calculation method.

17. The baseline unit as claimed in claim 15, configured to:
calculate a baseline signal for each of the force sensors from its sensor signal using the baseline-calculation method; and
calculate the baseline test signal based on a combination of the N baseline signals;
optionally wherein:
the baseline test signal is based on a sum or average of the N baseline signals; and/or
the sensor test signal is based on a sum or average of the N sensor signals.

18. The baseline unit as claimed in claim 17, wherein:
the N sensor signals define a sensor test vector in N-dimensional space;
the N baseline signals define a baseline test vector in the N-dimensional space; and
the baseline unit is configured to determine a difference between the sensor test signal and the baseline test signal as the measure of the rate of change of the sensor test signal based on a distance such as a Euclidean distance between respective locations in the N-dimensional space defined by the sensor test vector and the baseline test vector.

19. The baseline unit as claimed in claim 14, wherein the baseline unit is configured to:
  apply a signal-conditioning process to the N sensor signals to generate N conditioned sensor signals, respectively;
  calculate the baseline test signal from said N conditioned sensor signals; and
  derive the sensor test signal from said N conditioned sensor signals;
  optionally wherein the signal-conditioning process comprises removing the common mode from the N sensor signals.

20. A baseline unit for use in a sensor system, the sensor system comprising N force sensors which output N sensor signals, respectively, where $N \geq 1$, the baseline unit configured to:
  monitor at least one feature of a sensor test signal, the sensor test signal being one of said N sensor signals or a signal derived from one or more of said N sensor signals; and
  in dependence upon the at least one feature, control a stored baseline setting to control how a baseline test signal is calculated from said N sensor signals using a baseline-calculation method, the baseline-calculation method configured by the currently-stored baseline settings;
  optionally wherein the at least one feature comprises a gradient, a rate of change, temporal variance or jitter of the sensor test signal, or a measure thereof.

* * * * *

UNITED STATES PATENT AND TRADEMARK OFFICE
CERTIFICATE OF CORRECTION

| | |
|---|---|
| PATENT NO. | : 11,513,019 B2 |
| APPLICATION NO. | : 17/128676 |
| DATED | : November 29, 2022 |
| INVENTOR(S) | : Lindemann et al. |

It is certified that error appears in the above-identified patent and that said Letters Patent is hereby corrected as shown below:

In the Claims

In Column 23, Line 29, in Claim 20, delete "settings;" and insert -- setting; --, therefor.

Signed and Sealed this
Twenty-eighth Day of February, 2023

*Katherine Kelly Vidal*

Katherine Kelly Vidal
*Director of the United States Patent and Trademark Office*